(12) United States Patent
Byl et al.

(10) Patent No.: US 11,511,437 B2
(45) Date of Patent: Nov. 29, 2022

(54) WHEELED BASE

(71) Applicant: UBTECH ROBOTICS CORP LTD, Shenzhen (CN)

(72) Inventors: Marten Byl, Goleta, CA (US); Chengkun Zhang, Pasadena, CA (US); Raymond Ma, Pasadena, CA (US); Muhammed Rasid Pac, Temple, CA (US); Huan Tan, Pasadena, CA (US); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 401 days.

(21) Appl. No.: 16/923,069

(22) Filed: Jul. 7, 2020

(65) Prior Publication Data

US 2021/0347060 A1 Nov. 11, 2021

Related U.S. Application Data

(63) Continuation of application No. 16/870,903, filed on May 9, 2020.

(51) Int. Cl.
| | |
|---|---|
| *B25J 11/00* | (2006.01) |
| *B25J 5/00* | (2006.01) |
| *B65G 1/02* | (2006.01) |
| *B65G 61/00* | (2006.01) |
| *B25J 9/16* | (2006.01) |
| *B25J 9/10* | (2006.01) |
| *B25J 9/12* | (2006.01) |
| *B25J 19/00* | (2006.01) |

(Continued)

(52) U.S. Cl.
CPC .............. *B25J 11/009* (2013.01); *B25J 5/007* (2013.01); *B25J 9/0009* (2013.01); *B25J 9/106* (2013.01); *B25J 9/123* (2013.01); *B25J 9/1697* (2013.01); *B25J 19/0075* (2013.01); *B25J 19/023* (2013.01); *B65G 1/026* (2013.01); *B65G 61/00* (2013.01); *G05D 1/0214* (2013.01)

(58) Field of Classification Search
CPC ... B25J 5/00; B25J 5/007; B25J 9/0003; B25J 11/009; B25J 19/0091; B62B 5/0404; B62B 5/0457; B62B 5/049; B62B 2203/10; G05D 1/0214; G05D 2201/0203; G05D 2201/0206; G05D 2201/0215; Y10S 901/01
See application file for complete search history.

(56) References Cited

U.S. PATENT DOCUMENTS

| | | | |
|---|---|---|---|
| 6,443,543 B1 * | 9/2002 | Chiang | ................ G05D 1/0246 312/319.7 |
| 2006/0149419 A1 * | 7/2006 | Ogawa | ..................... B25J 5/007 700/245 |

(Continued)

*Primary Examiner* — Dale Moyer

(57) ABSTRACT

A wheeled base includes a housing, two driven wheeled mechanisms positioned on a bottom of the housing and on opposite sides of the housing, at least one passive wheel positioned on the bottom of the housing, actuated feet positioned on the bottom of the housing and configured to move up and down, sensors, and a battery pack arranged within the housing. The two driven wheeled mechanisms each includes a damping mechanism, and each damping mechanism includes at least two dampers configured to absorb impact caused by an upward movement of the housing, and absorb impact caused by a downward movement of the housing.

20 Claims, 32 Drawing Sheets

(51) Int. Cl.
*B25J 9/00* (2006.01)
*B25J 19/02* (2006.01)
*G05D 1/02* (2020.01)

(56) References Cited

U.S. PATENT DOCUMENTS

2017/0065355 A1\* 3/2017 Ross ................ A61B 34/30
2021/0354966 A1\* 11/2021 Kong ................ B66F 9/12

\* cited by examiner

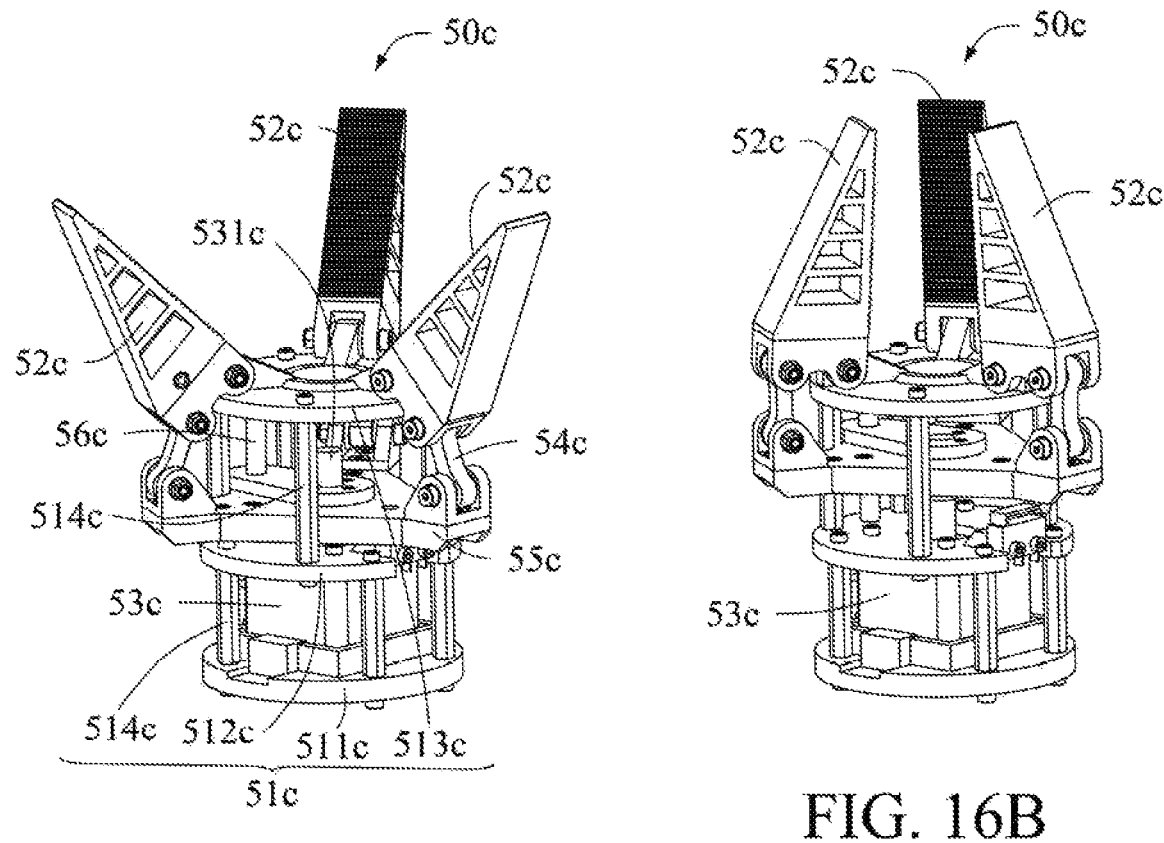
FIG. 16A
FIG. 16B
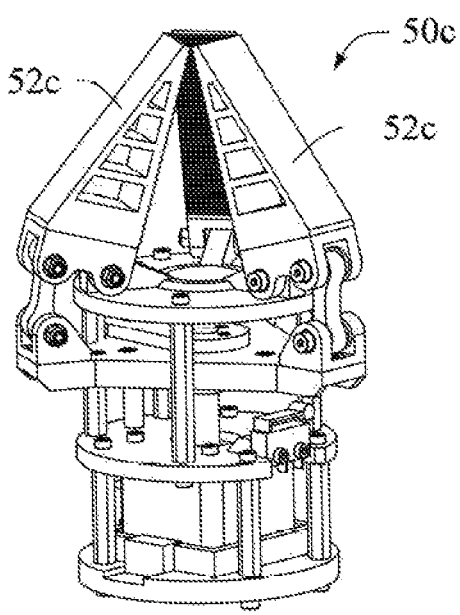
FIG. 16C

WHEELED BASE

CROSS REFERENCE TO RELATED APPLICATION

This application is a continuation of and claims priority to co-pending application Ser. No. 16/870,903 titled "ROBOTIC ASSISTANT", which was filed on May 9, 2020. The application is incorporated by reference herein in its entirety.

TECHNICAL FIELD

The present disclosure generally relates to robots, and particularly to a wheeled base of a smart logistics robotic assistant, which can perform delivery, tracking, and other tasks.

BACKGROUND

The huge increase in the global elderly population is accompanied by problems, such as the shortage of health professionals, the reduced quality of elderly care service, and the economic challenges of medical treatment. Recent advances in robotics provide an innovative solution to alleviate these challenges by improving elderly quality of life and prioritizing their dignity and independence. As such, healthcare robots have attracted significant attention in recent years. By providing assistance in tasks, such as monitoring and tracking elderly health, and performing repetitive tasks, the healthcare robots are capable of serving both health professionals and the elderly.

One type of a robotic assistant can be designed to assist humans in performing tasks, such as performing logistics and transportation tasks. For example, robotic assistants, especially in use in the healthcare industry, such as a hospital, typically includes wheels for movement and fixed storage containers/trays, which allows the robotic assistants to deliver objects, such as medicines, equipment, and food to a desired location.

Some robotic assistants include a wheeled base for movement. The wheeled base may include a spring suspension for keeping all wheels touching the flooring when uneven surfaces are present. However, the spring suspension is not very effective for shock absorption. Some robotic assistants may further include shock absorbers or dampers for shock absorption. However, because unidirectional shock absorption nature of these shock absorbers, they only dampen oscillation in one direction, and thus need more time to absorb shock, which may result in non-smooth motion of the wheeled base when the wheeled base travels over gaps between the floor and the elevator as well as other small bumps or gaps. Furthermore, these wheeled bases are often not stable under a side load, which may affect movement and performance of the robotic assistants.

Therefore, there is a need to provide a wheeled base of a robotic assistant to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 16A is an isometric view of another EOAT of the robotic assistant according to one embodiment.

FIG. 16B is an isometric view of the EOAT of FIG. 16A.

FIG. 16C is an isometric view of the EOAT of FIG. 16A.

DETAILED DESCRIPTION

Figure 1A:
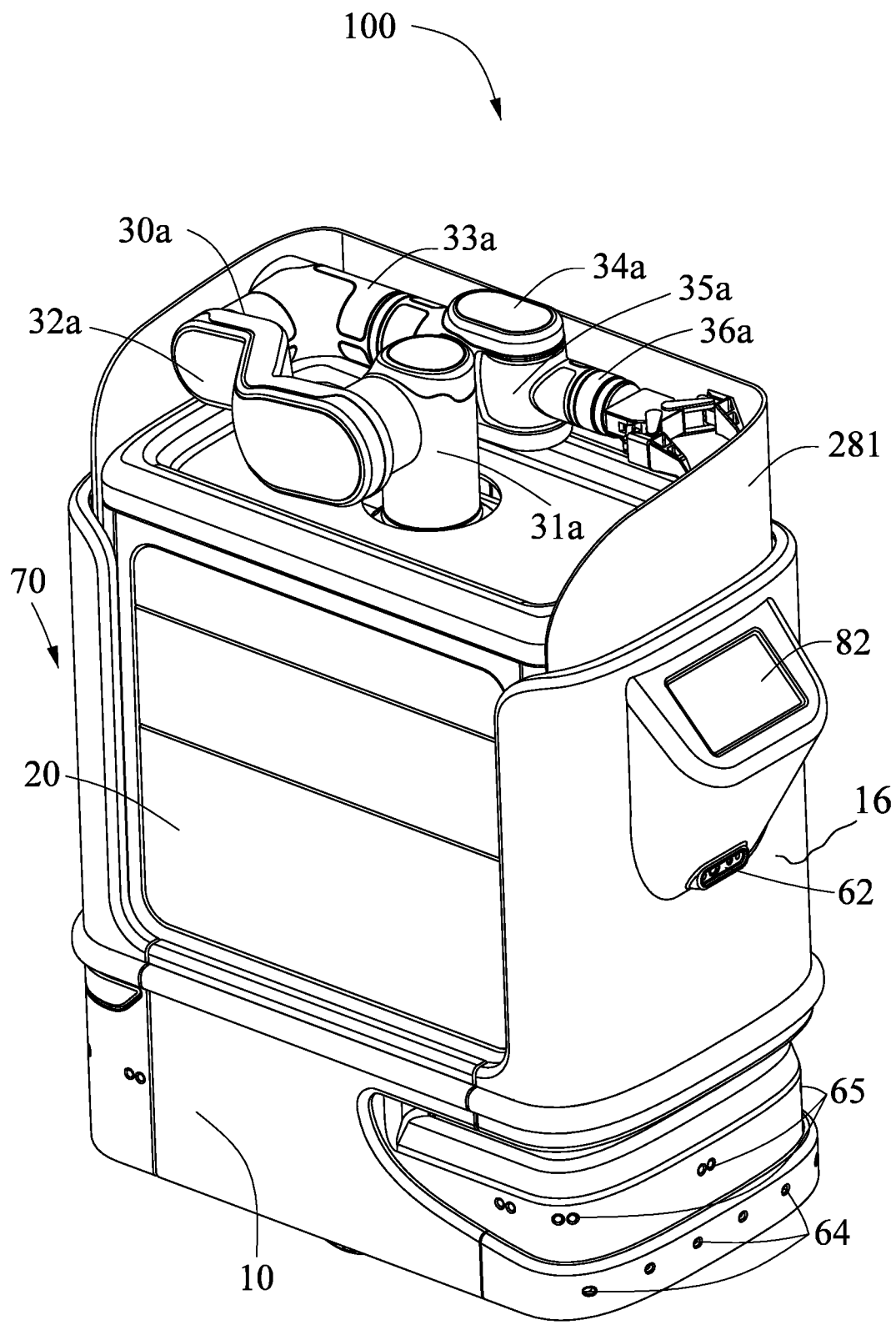
FIG. 1A is an isometric view of a robotic assistant according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1B:
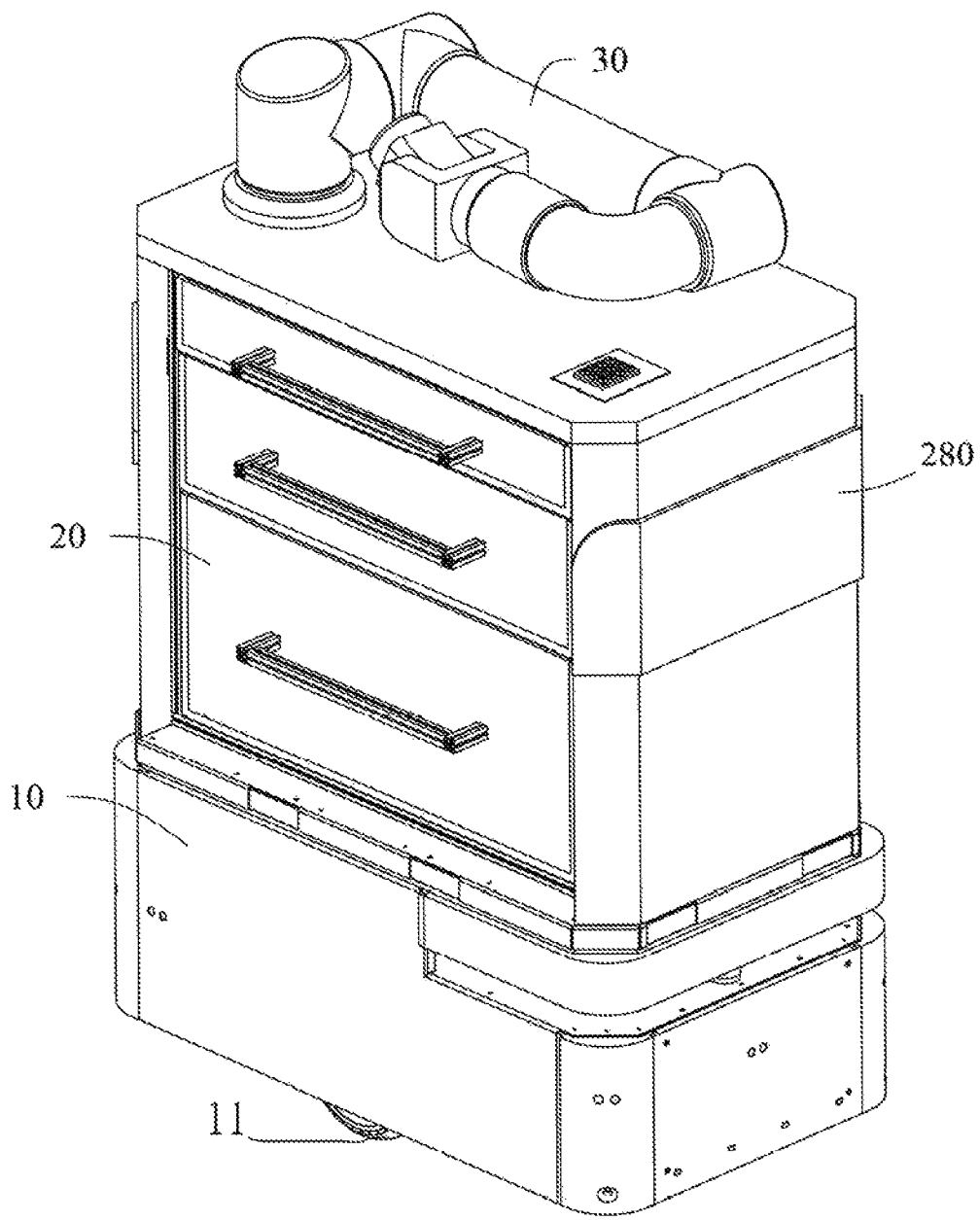
FIG. 1B is an isometric view of a robotic assistant according to another embodiment.

FIG. 1A and FIG. 1B are isometric views of a robotic assistant 100 that employs an elevational and an extended reach mechanism to assist humans in performing tasks, such as logistics and transportation tasks. In one embodiment, the robotic assistant 100 may be employed in facilities, such as a healthcare facility, an elderly care facility, and the like, to aid healthcare professionals in their daily tasks. However, the robotic assistant 100 may also be employed in security/surveillance scenarios. In one exemplary embodiment, the robotic assistant 100 can be employed in assisted living facilities or healthcare facilities to provide an unsupervised end-to-end logistics solution to cater to various delivery and logistics needs, ranging from food to medicines in a timely fashion. The robotic assistant 100 can free healthcare providers from the time-consuming tasks of fetching and delivering objects along with other menial and repetitive errands, so that they can focus on attending to much more important physical and emotional needs of assisted living people or others. However, it should be understood that the robotic assistant 100 may be employed in other facilities, such as warehouses, packaging facilities, schools, and restaurants, etc., depending on the embodiment.

With reference to FIG. 1A to FIG. 3, the robotic assistant 100 includes a wheeled base 10, a storage unit (e.g., drawer mechanism 20 comprising one or more drawers 21), a foldable arm 30 connected to a top of the drawer mechanism 20, an elevation mechanism 40, sensors 62, 63, 64, and 65, and a control system 70 that receives command instructions from a host computer, and a graphic user interface (GUI) displayed on display 82 to allow operators to directly control the robotic assistant. In response to the command instructions, the control system 70 controls movement of the wheeled base 10, the foldable arm 30, and the elevation mechanism 40, and/or other mechanical or software aspects of the robotic assistant 100. In other embodiments, the storage unit may include open shelves. In another embodiment, the foldable arm 30 may be omitted, or replaced with a manipulator of different configuration of different degrees-of-freedom.

The wheeled base 10 provides a movement mechanism for the robotic assistant 100 to go from location to location. In one embodiment, the wheeled base 10 includes two differentially driven wheel mechanisms 11 and one or more other wheels. The driven wheel mechanisms 11 allow for movement of the wheeled base 10 along a determined path, while the one or more other wheels allow for balance and stability of the wheeled base 10. A suspension system for the wheeled base 10 allows for smoother traveling over small gaps, carpet, mats, and imperfections of a floor. Additionally, use of the wheeled base 10 allows for the robotic assistant 100 to traverse various floors of assisted living facilities via entering and exiting of an elevator. The one or more other wheels may be castor wheels or omni-directional driving wheels. Further description of the wheeled base 10 is provided below.

Figure 3:
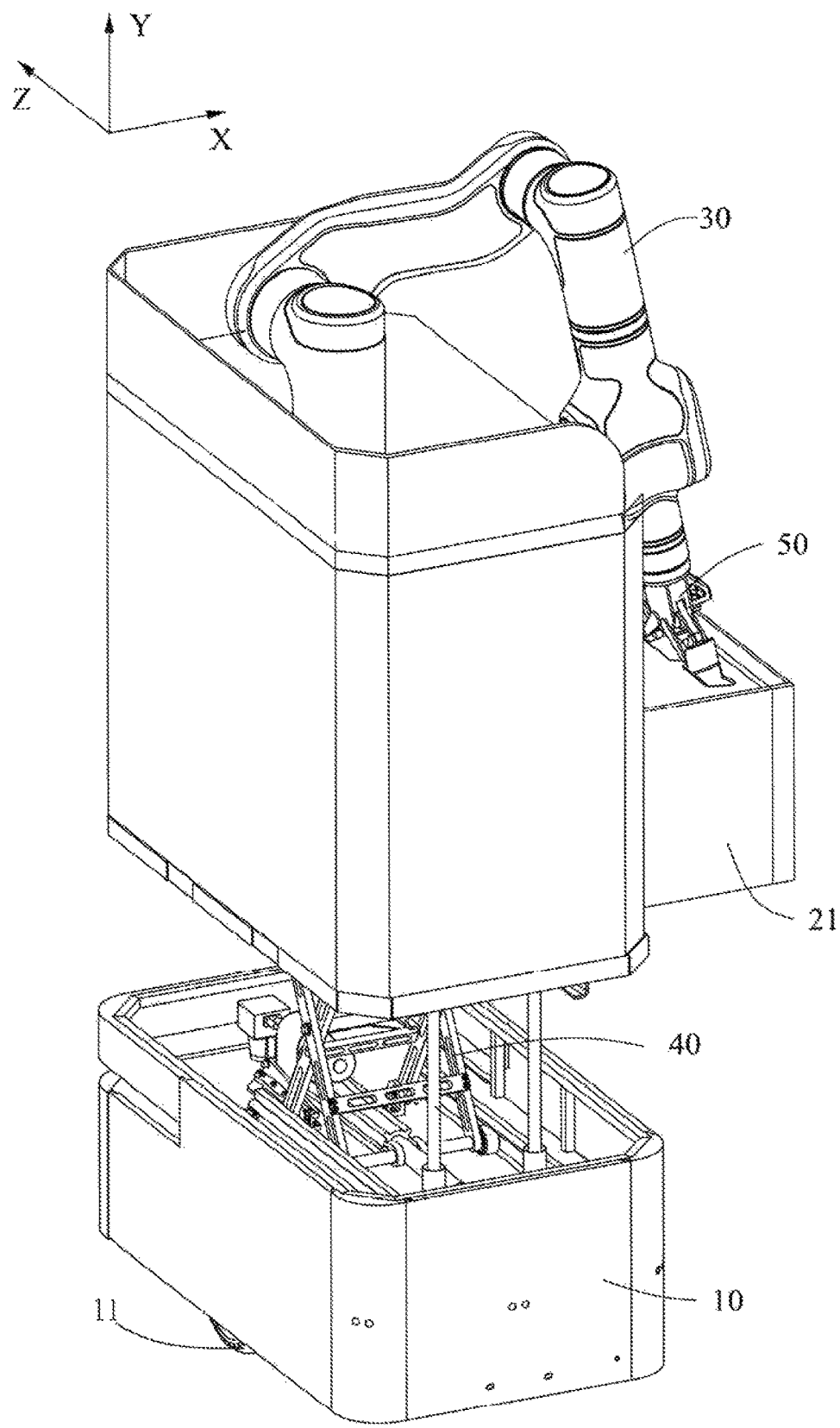
FIG. 3 is an isometric view of the robotic assistant of FIG. 1B in an elevated state.

The storage unit includes the drawer mechanism 20 that is a platform for one or more drawers 21. The drawers 21, via actuation of the drawer mechanism 20, can be in an open state and a closed state. In one embodiment, prescription medicines, needles, and surgical equipment may be stored in the drawers 21. The one or more drawers 21 may be stacked on top of each other in a vertical direction (e.g., along the y-axis as shown in FIG. 3), to save valuable space and/or in a horizontal direction (e.g., along the x-axis as shown in FIG. 3). Each drawer 21 may be opened individually or in combination. In one example, the drawers 21 can be locked and only unlocked and opened by an authorized healthcare professional and/or when the robotic assistant 100 delivers one or more goods to designated location and/or authorized personnel. It should be note that the number and configuration of the drawers 21 are not limited and can change according to actual needs. For example, the drawers 21 may be in the form of open shelves when the robotic assistant 100 is in use in a restaurant. In this example, food items, such as plates, trays, and cups may be placed onto the open shelves and removed quickly and easily. The open shelves may be stacked in a vertical and/or horizontal direction. Alternatively, the drawers 21 may be in the form of a closed or semi-closed housing having a depth, height, length, and width.

The foldable arm 30 is connected to a top of the drawer mechanism 20 and includes an end of arm tooling (EOAT) 50 or EOAT robotic gripper at a distal end of the foldable arm 30. Via actuation of the foldable arm 30, the foldable arm 30 can extend into an open position or a folded position. In the folded position, the foldable arm 30 can be actuated to fold in a flat state or substantially flat state on top of the drawer mechanism 20. A visor or guard, which may be made of clear or translucent plastic/polycarbonate or any other materials, may be used to obscure and/or protect the arm 30. When the foldable arm 30 is in an operation mode, the visor/guard can be automatically retracted to increase the working space of the foldable arm 30. Additionally, this foldable arm 30 together with the elevation mechanism 40 allows the robotic assistant 100 to have an extended reach mechanism that extends beyond the basic physical footprint of the robotic assistant 100. The EOAT 50 is provided at a distal end of the foldable arm 30 and can grasp various objects, such as prescription medicines, gloves, or water bottles. The foldable arm 30 and EOAT 50 may be used to grasp objects on a shelf and deposit those objects into the drawers 21. Later, the foldable arm 30 and EOAT 50 are configured to reach into the drawers 21, retrieve the objects, and deliver them to a different shelf, table, or into hands of a healthcare professional or a patient. The foldable arm 30 and EOAT 50 are also configured to place objects into empty drawers 21 and empty shelves. Further details are provided below. The EOAT 50 can be akin to a human hand, to further personify the robotic assistant 100.

The elevation mechanism 40 is connected between the wheeled base 10 and the drawer mechanism 20. Via actuation of the elevation mechanism 40, the drawer mechanism 20 can move up and down between a retracted position (see FIG. 1A) and an extended position (see FIG. 3). In the retracted position, the elevation mechanism 40 enables the robotic assistant 100 to have a limited height, which facilitates stability during movement and travel of the robotic assistant 100. In the extended position, the elevation mechanism 40 enables the foldable arm 30 to have increased reachability in the vertical direction. The elevation mechanism 40 can be actuated to adjust the robotic assistant 100 to a comfortable height for elderly people who might be lying in the bed, sitting in the wheelchair, or standing. Further description of the elevation mechanism 40 is provided below. In the case the arm guard is stationary, the elevation mechanism 40 allows the base of the foldable arm 30 to be even with the top rim of the arm guard, such that the foldable arm 30 has maximum working space. In an alternative embodiment, the arm guard 281 can be fully retracted to yield maximum operation space for the foldable arm 30 without modulating the height of the elevation mechanism 40. The drawer mechanism 20 and the elevation mechanism 40 that are disposed on top of the wheeled base 10 are also referred to as a movable mechanism.

Figure 2:
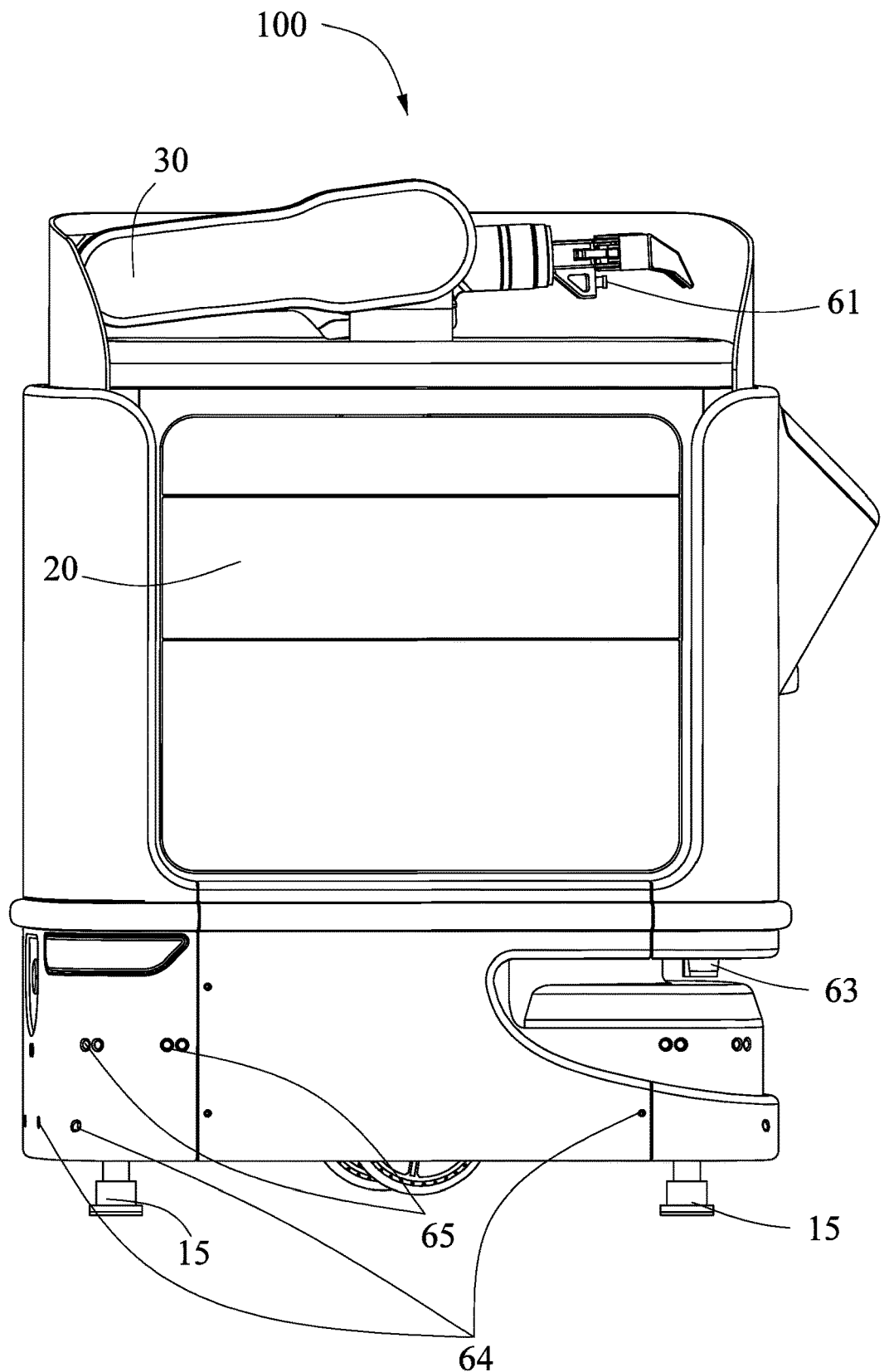
FIG. 2 is a planar view of the robotic assistant of FIG. 1A.

The sensors enable the robotic assistant 100 to perceive an environment so that the robotic assistant 100 can perform tasks. In one embodiment, the sensors include ranging sensors that require no physical contact with objects being detected. They allow the robotic assistant 100 to perceive an obstacle without actually having to come into contact with it. The ranging sensors may include infrared (IR) sensors 64, ultrasonic sensors 65, one or more light detection and ranging (LiDAR) sensors 63, near field communication (NFC), and RFID sensors/readers. In one embodiment, the sensors may include inertial measurement unit (IMU) sensors and a camera 62. Each IMU sensor 66 incorporates at least one accelerometer and at least one gyroscope. The one or more LiDAR sensors 63 are used to create environment map. In combination with the IMU sensors 66, the LiDAR sensors 63 are used to determine a real-time position of the robotic assistant 100 in the environment map. Data from the ranging sensors and the camera 62 are used to detect obstacles, such as equipment or people, during movement of the robotic assistant 100. The robotic assistant 100 can thus move autonomously along a determined path. These sensors can be positioned along the wheeled base 10 or other positions of the robotic assistant 100, such as being on the foldable arm 30 or EOAT 50. Further description of the sensors is provided below. As shown in FIG. 1A, at least one of the sensors (e.g., sensor 62) is disposed on a static member 16 that is disposed on top of the wheeled base 10 and adjacent to the movable mechanism. As shown in FIGS. 1A and 2, in one embodiment, the ultrasonic sensors 65 are disposed on a front end, a rear end, as well as two sides of a housing of the wheeled base 10, and the infrared sensors 64 are disposed on the front end and the rear end of the housing of the wheeled base 10.

The control system 70 is electronically connected to the wheeled base 10, the drawer mechanism 20, the foldable arm 30, the elevation mechanism 40, and the sensors, and is configured to receive command instructions to control the robotic assistant 100 to perform tasks. The command instructions can be received from the control system 70 in response to movement/action of the robotic assistant, or the control system 70 can receive command instructions from a host computer either wirelessly or through a wired connection, or through the GUI on the display 82. In response to the command instructions, the control system 70 controls movement of the wheeled base 10, opens or closes the one or more drawers 21, actuates movement of the foldable arm 30 and the EOAT 50 to pick up and place external objects from/to a determined location, and controls the drawer mechanism 20 to actuate the one or more drawers 21. Further description of the control system 70 is provided below. The determined location may be a location within the one or more drawers when fully opened.

Figure 4:
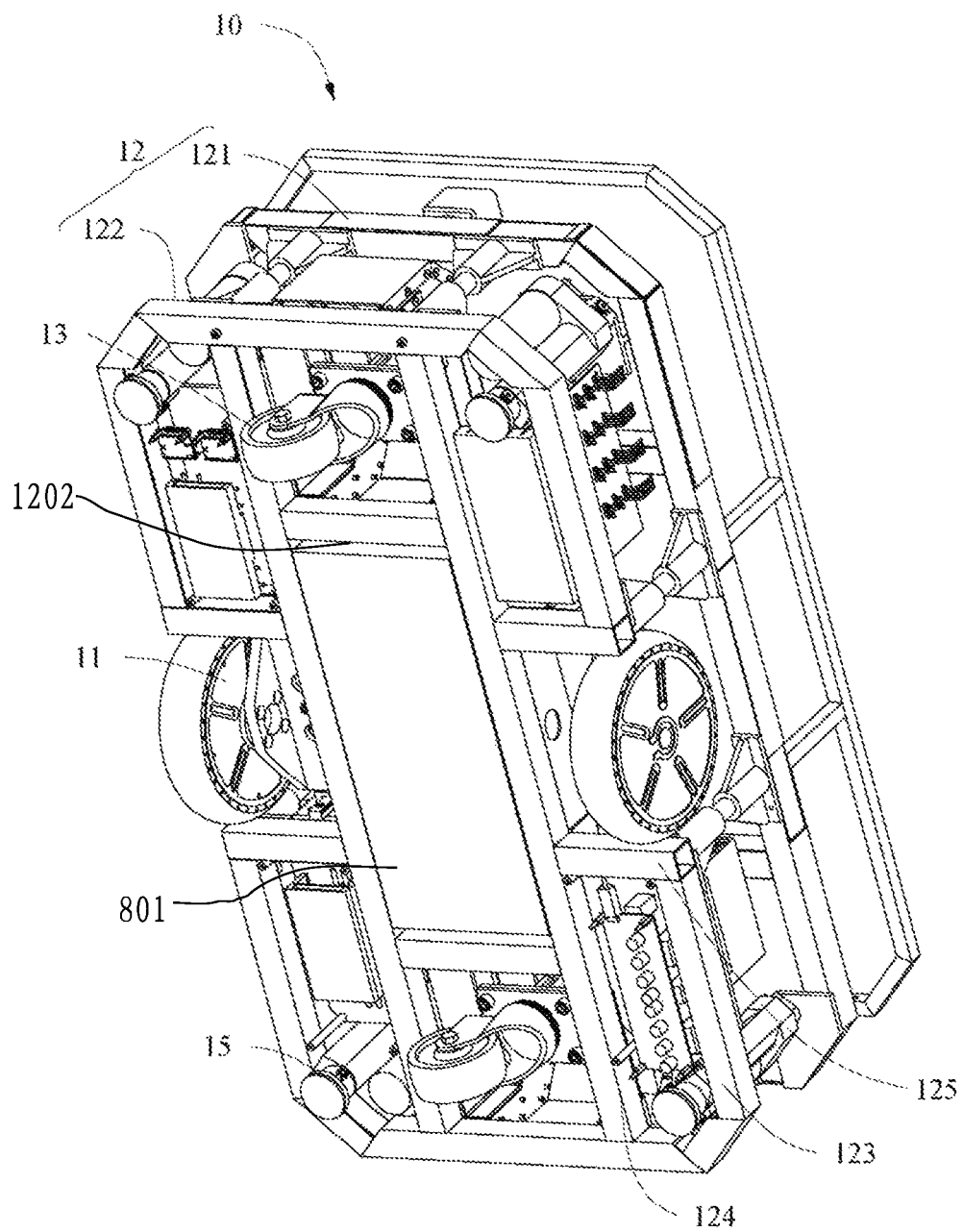
FIG. 4 is an isometric view of a wheeled base of the robotic assistant of FIG. 1A.
Figure 10A:
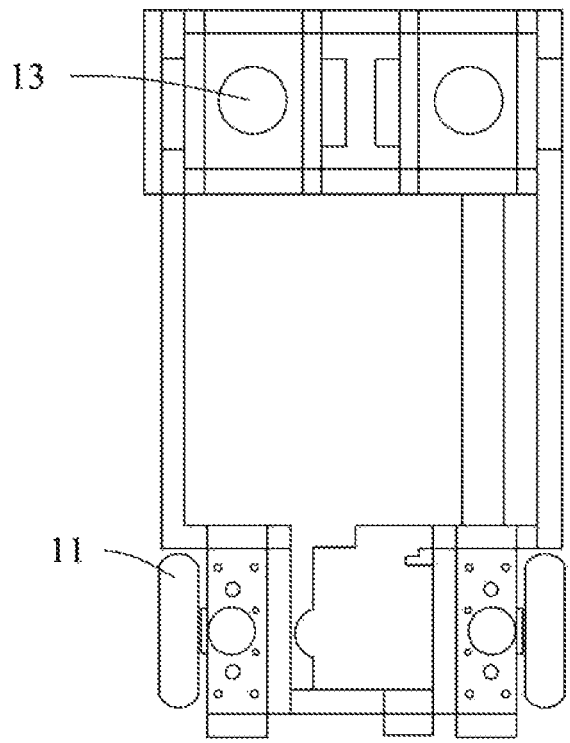
FIG. 10A shows a schematic view of a wheeled base including driven wheel mechanisms and caster wheels according to one embodiment.
Figure 10B:
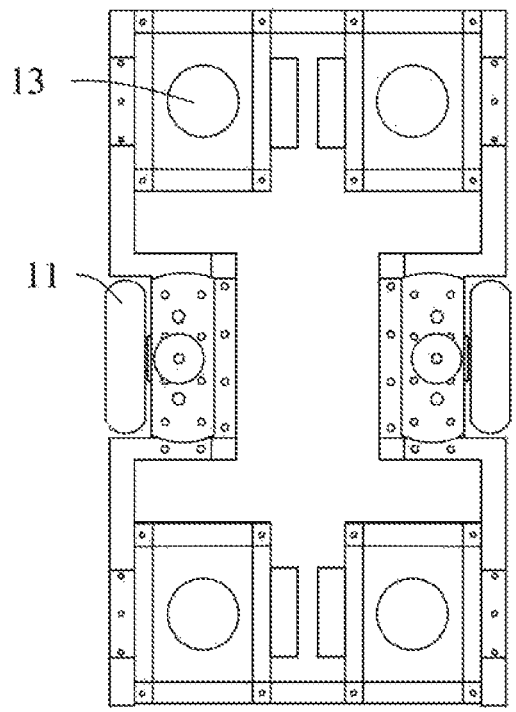
FIG. 10B shows a schematic view of an alternative wheeled base including two driven wheel mechanisms and four caster wheels that are arranged at four corners of the wheeled base according to one embodiment.

The wheeled base 10 is a differential drive platform, in one example. With reference to FIG. 4, in one embodiment, the wheeled base 10 includes two independently actuated driven wheel mechanisms 11 and two castor wheel mechanisms 13. The two driven wheel mechanisms 11 are spaced apart from each other and arranged at opposite sides of the wheeled base 100, with their rotation axes aligned with each other and extending along a widthwise direction of the wheeled base 10. The two castor wheel mechanisms 13 are respectively arranged adjacent to opposite ends in the lengthwise direction of the wheeled base 10. It should be noted that the number and arrangement of the driven wheel mechanisms 11 and castor wheel mechanisms 13 may change according to actual needs. For example, in an alternative embodiment as shown in FIG. 10A, two driven wheel mechanisms 11 and two castor wheel mechanisms 13 may be respectively arranged at four corners of the wheeled base 10. In yet an alternative embodiment as shown in FIG. 10B, two driven wheel mechanisms 11 may be arranged in a way similar to one embodiment of FIG. 4, and four castor wheel mechanisms 13 may be respectively arranged at four corners of the wheeled base 10.

Figure 5:
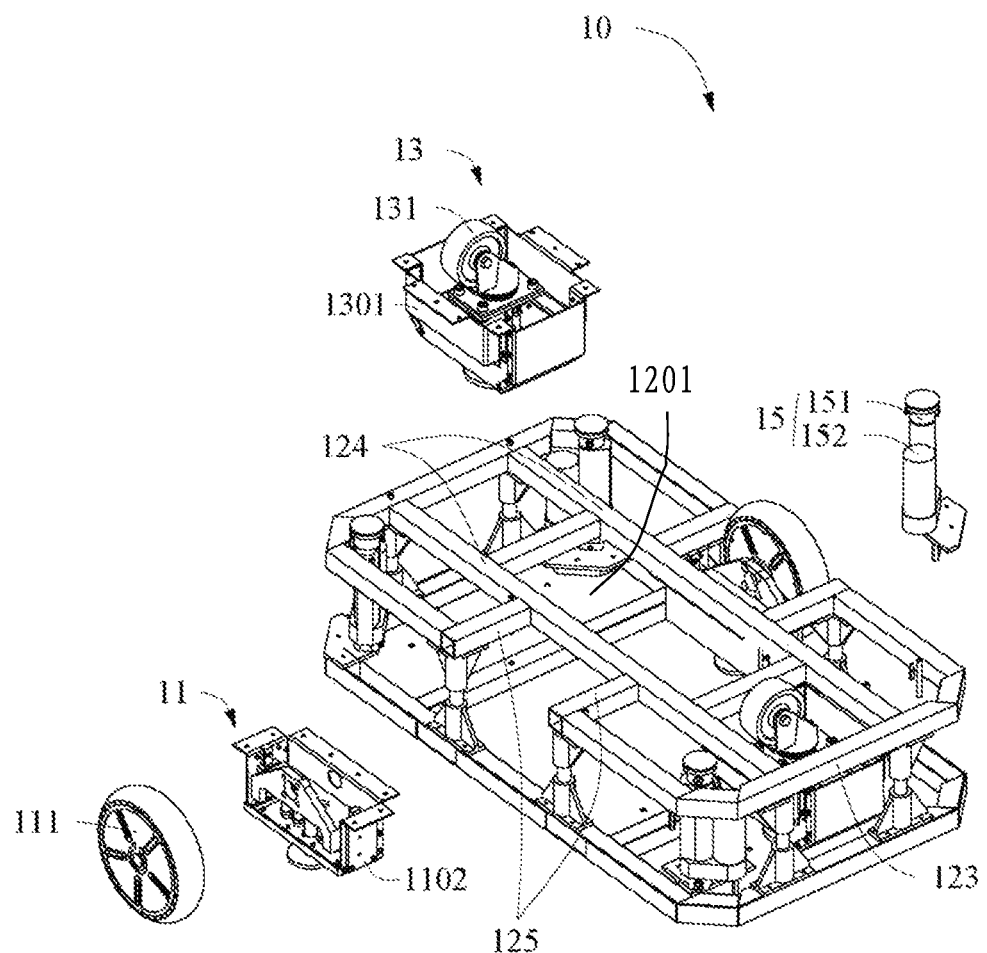
FIG. 5 is a semi-exploded view of the wheeled base of FIG. 4, viewed from a different perspective.

With reference to FIGS. 4 and 5, in one embodiment, the wheeled base 10 includes a base body (also referred to a housing) 12 including a top member 121 and a bottom member 122 that are spaced apart from and connected to each other. As shown in FIG. 4, the two driven wheeled mechanisms 11 are positioned on a bottom of the housing and on opposite sides of the housing, and the castor wheel mechanisms 13 are positioned on the bottom of the housing. In one embodiment, the top member 121 is in the form a rectangular frame and includes a number of bars that are connected to one another. The bottom member 122 includes a number of outer bars 123 that are connected to one another, two inner bars 124, and four connection bars 125. The two inner bars 124 are received in the space defined by the outer bars 123, and extend along a lengthwise direction of the base body 12. Opposite ends of each inner bar 124 are respectively connected to the outer bars 123 at opposite end of the base body 12. A first pair of the connection bars 125 are connected to one inner bar 124 and the outer bars 123 at one side of the base body 12, which defines a space to receive one driven wheel mechanism 11. A second pair of the connection bars 125 are connected to the other inner bar 124 and the outer bars 123 at the opposite side of the base body 12, which define a space to receive the other driven wheel mechanism 11. Of course, it should be understood that the connection bars 125 provide support and placement and number of them can be adjusted according to actual needs. As shown in FIG. 4, in one embodiment, the wheeled base 10 further includes a battery pack 801 received in a space 1201 (see FIG. 5) defined in the housing of the wheeled base 10. The space 1201 has an opening 1202 that allows the battery pack 801 to be removed.

In one embodiment, one driven wheel mechanism 11 is connected to the first pair of connection bars 125 and one inner bar 124, and another driven wheel mechanism 11 is connected to the second pair of connection bars 125 and the other inner bar 124. Caster wheels 13 are connected to the inner bars 124 and located adjacent to opposite longitudinal ends of the base body 12.

Figure 6:
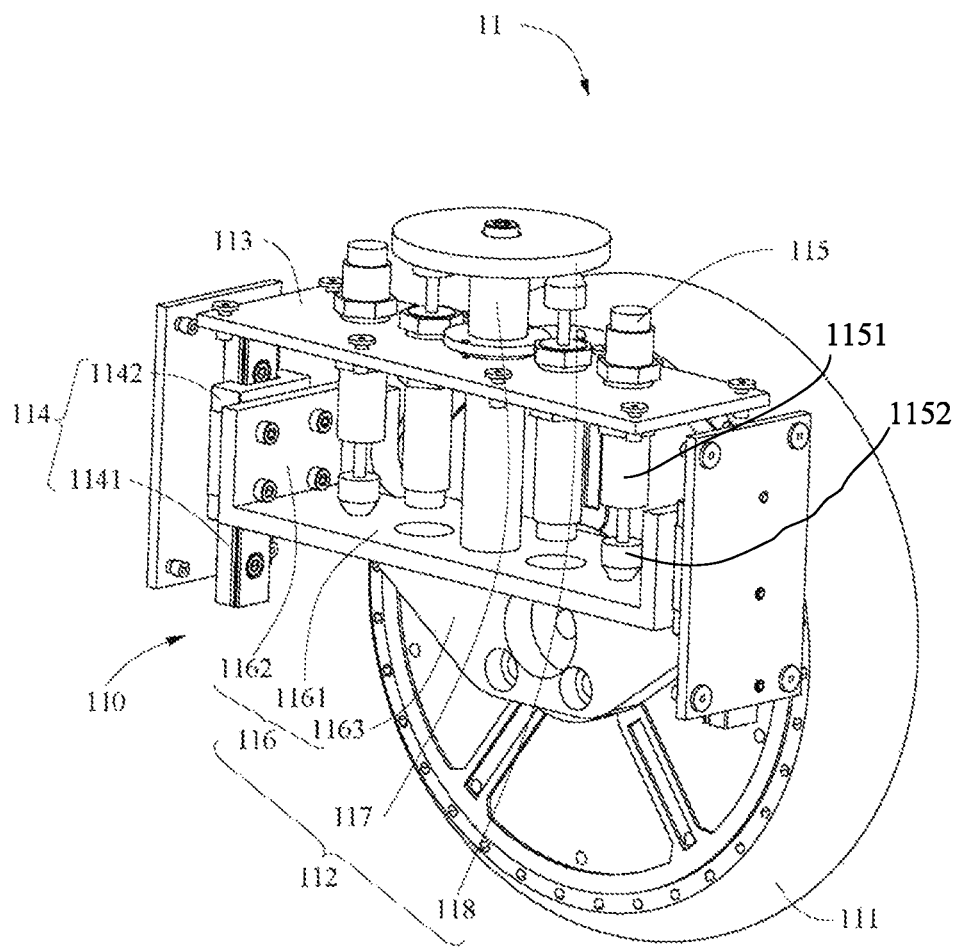
FIG. 6 is an isometric view of a driven wheel mechanism of the wheeled base of FIG. 4.

With reference to FIGS. 5 and 6, in one embodiment, each driven wheel mechanism 11 includes a spring and damper suspension mechanism (also referred to as damping mechanism) 110, and a wheel 111 that is connected to the suspension mechanism 110. In one embodiment, a motor can be arranged within the wheel 111 and configured to drive the wheel 111 to rotate. The suspension mechanism 110 gives each wheel 111 the freedom to slightly move up and down with respect to the base body 12, which enables smooth travelling over a gap between the floor and the elevator as well as other small bumps or gaps. In one embodiment, the suspension mechanism 110 includes a housing 1102 fixed to a pair of connection bars 125 and one inner bar 124, a fixed member 113 fixed to the housing 1102, a slidable member 112, two linear slide bearings 114 that enable the slidable member 112 to move up and down with respect to the fixed member 113, and a number of dampers 115 fixed to the fixed member 113. In another embodiment, damping performance can be achieved by replacing the driving wheels with ones with pneumatic tires or modulating tire materials of the driving wheels.

With reference to FIGS. 5 and 6, the housing 1102 is a structure that receives components of the suspension mechanism 110. In one embodiment, the fixed member 113 is a flat plate and substantially horizontal when fixed to the housing 1102. The slidable member 112 includes a main body 116, a cap 118, and a post 117 having opposite ends respectively fixed to the main body 116 and the cap 118. In one embodiment, the main body 116 is connected to the housing 11 via the linear slide bearings 114. The main body 116 includes a base 1161, two sidewalls 1162 protruding from opposite ends of the base 1161, and a wheel connecting portion 1163 protruding from a lower side of the base 1161. The lower end of the post 117 is fixed to the base 1161. Each slide bearing 114 includes a slide rail 1141 and a slider 1142 that is slidable on the slide rail 1141. The slide rail 1141 is fixed to the housing 1102 and extends in a substantial vertical direction. The sidewalls 1162 are respectively fixed to the sliders 1142, which enables the main body 116 to move together with the sliders 1142 in the substantially vertical direction. The wheel 111 can be fixed to the wheel connecting portion 1163, in one embodiment.

With reference to FIG. 6, the post 117 is substantially perpendicular to the main body 116 and passes through a through hole in the fixed member 113, which allows the post 117 to move together with the main body 116 in the vertical direction. The cap 118 is a flat tab fixed to the top end of the post 117, and the cap 118 and the main body 116 and located at opposite sides of the fixed member 113. The dampers 115 can be internal spring dampers which are well known and will not be described herein. Each includes a hollow tube 1151 and a spring-loaded rod 1152 that is partly received in the tube 1151 and slidable with respect to the tube 1151. The rod 1151 can move into the tube 1151 and compress a spring to absorb shock, and restores to a normal position when pushed by the spring. In one embodiment, four dampers 115 are fixed to the fixed member 113, with the rods 1151 of two dampers 115 abutting against the main body 116 and the rods of the other two dampers 115 abutting against the cap 118. It should be noted that the driven wheel mechanism 11 may further include one or more springs. The springs restore the neutral position in response to ground irregularities, and the dampers 115 smooth motion and to limit resonance effects resulting from movement of the driven wheel mechanisms 11 and springs.

Figure 7:
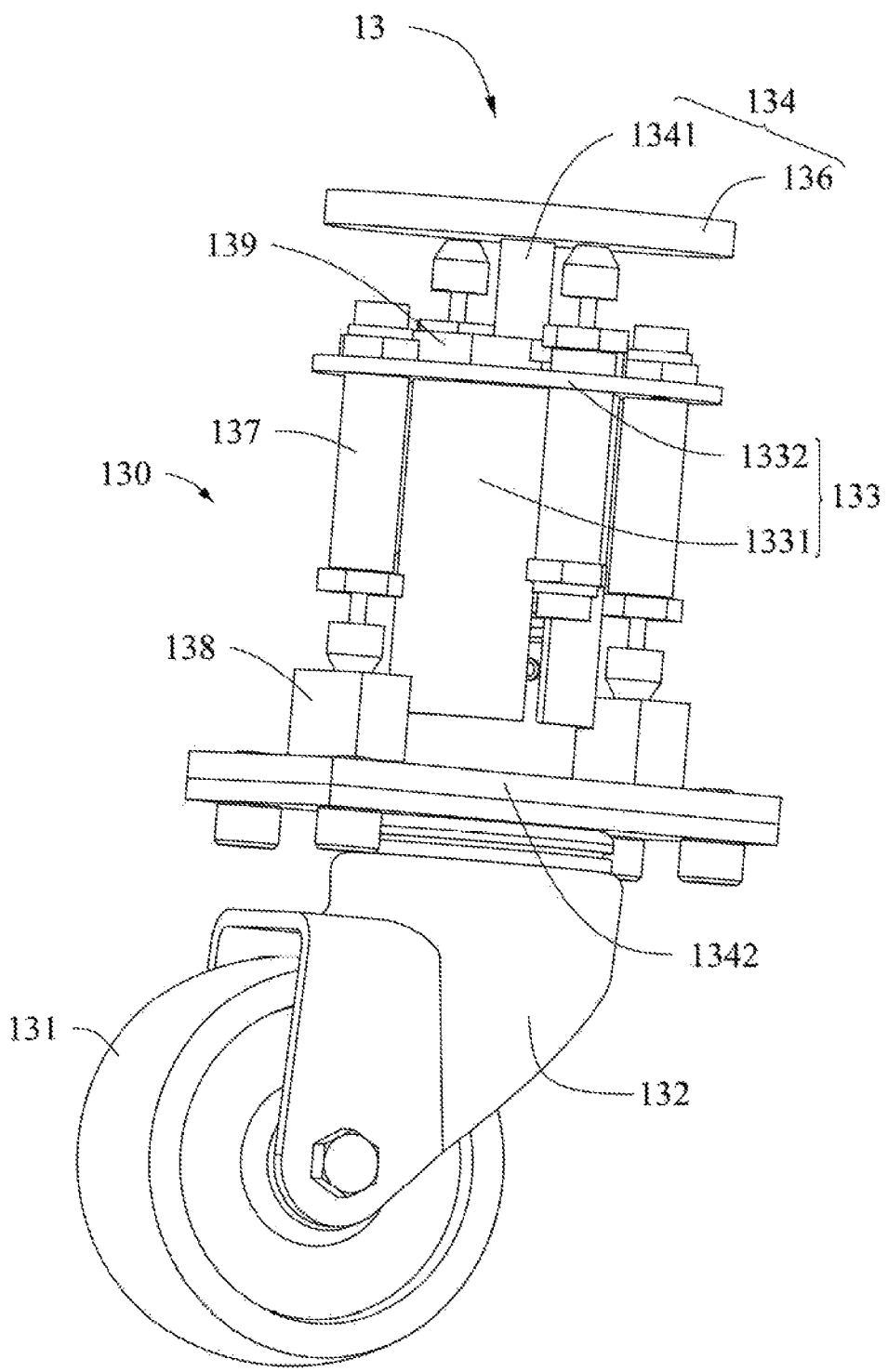
FIG. 7 is an isometric view of a caster wheel of the wheeled base of FIG. 4.

With reference to FIGS. 5 and 7, in one embodiment, each castor wheel mechanism 13 includes a spring and damper suspension mechanism (also referred to as damping mechanism) 130, a wheel connection member 132 that is connected to the bottom of the suspension mechanism 130 and rotatable about a substantially vertical axis, and a wheel 131 that is connected to the wheel connection member 132 and rotatable about a substantially horizontal axis. With such arrangement, the wheel 131 has two degrees of freedom, and can thus align itself to the direction of travel.

With reference to FIGS. 5 and 7, in one embodiment, the suspension mechanism 130 includes a housing 1301 (FIG. 5) that receives other components of the suspension mechanism 130. The suspension mechanism 130 further includes a hollow tube 133, a movable member 134 and a number of dampers 137. The hollow tube 133 includes a tube portion 1331 and a tab 1332 that is formed at the top end of the tube portion 1331 and extends in an axial direction of the tube portion 1331. The tab 1332 is fixed to the housing 1301.

As shown in FIG. 7, the movable member 134 includes a spring-loaded rod 1341 that is connected to and passes through the tube 133, a connection plate 1342 and a tab 136 are respectively connected to opposite ends of the rod 1341. The rod 1341 is slidable in a vertical direction and can be movably connected to the tube portion 1331 through a slide bearing 139. The slide bearing 139 is fixed to the tab 1332 of the tube 133. The connection plate 1342 is connected to the wheel connection member 132. The rod 1341 can move with respect to the tube 133 and compress a spring to absorb shock, and restore to a normal position when pushed by the spring.

In one embodiment, as shown in FIG. 7, four dampers 137 are fixed to the tab 1332 and have the same configuration as the dampers 115. The rods of two dampers 137 abut against the tab 136 and the rods of the other two dampers 137 abut against two blocks 138 protruding from the connection plate 1342 to allow bi-directional damping performance. That is, these dampers are configured to absorb impact caused by an upward movement of the housing of the wheeled base 10, and absorb impact caused by a downward movement of the housing of the wheeled base 10. It should be noted that the two blocks 138 may be omitted and the rods of the other two dampers 137 may directly come into contact with the connection plate 1342. With such arrangement, the dampers 137 can absorb the shocks and vibrations that are inflicted on the wheels 131 by the gap between the floor and the elevator as well as other small bumps or gaps. It should be noted that the suspension mechanism 130 may be modified by using one pair of dampers or one damper to provide a unidirectional damping performance.

Figure 8A:
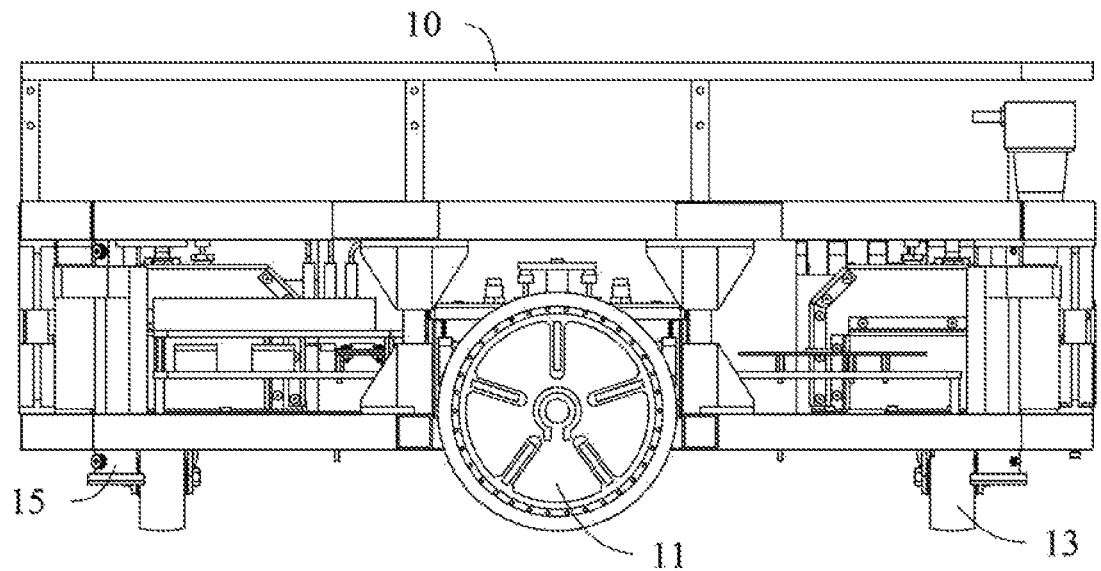
FIG. 8A is a planar view of the wheeled base of FIG. 4, with actuated feet in their retracted positions.
Figure 8B:
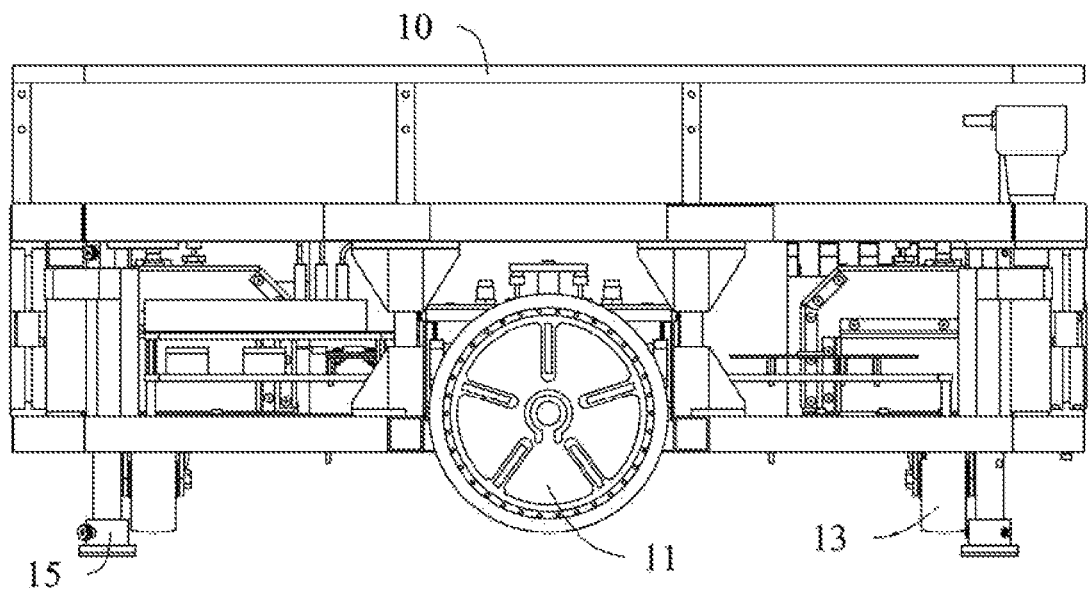
FIG. 8B is a planar view of the wheeled base of FIG. 4, with actuated feet in their extended positions.

With reference to FIGS. 5, 8A and 8B, in one embodiment, the robotic assistant 100 further includes a number of actuated feet 15 connected to the wheeled base 10. The actuated feet 15 are positioned on the bottom of the housing of the wheeled base 10. In one embodiment, four actuated feet 15 are spaced apart from one another and arranged at four corners of the wheeled base 10. Each actuated foot 15 includes a motor 152 (e.g., a linear motor) fixed to top member 121 of the wheeled base 10 and a foot 151 that is driven by the linear motor and movable between a retracted position (see FIG. 8A) and an extended position (see FIG. 8B). During movement of the wheeled base 10, the feet 151 are controlled to move to their retracted positions such that the wheels 111 and 131 can come into contact with a support surface (e.g., floor). During a manipulation task when the arm 30 is unfolded (in the extended position or the process of extending) and the drawers 21 are opened, the feet 151 are controlled to move to their extended positions and come into contact with the support surface, with the wheels 111 and 131 being out of contact with the support surface to isolate the suspension mechanism from the whole system to allow more accurate grasping and manipulation performance. Since the feet 151 can provide a greater support polygon than the wheels 111 and 131, the robotic assistant 100 can have increased static stability, which is a key factor during the manipulation task. The feet 151 also eliminate the effects of the suspension and provide a stiffer connection to the floor so that the arm base does not shift around as much due to its motion.

Figure 9:
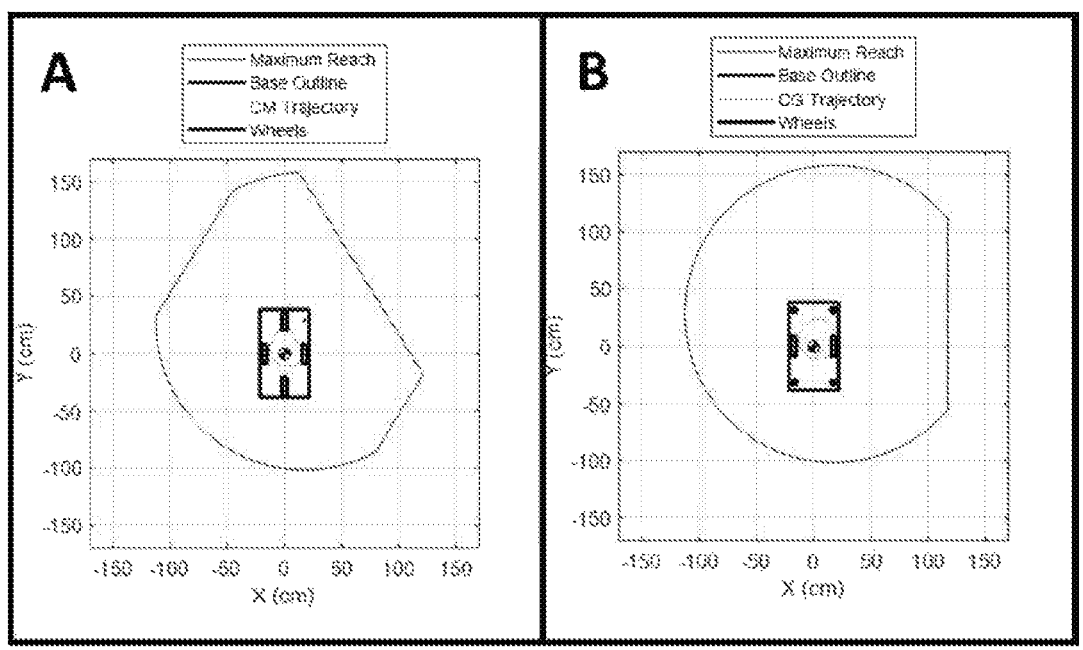
FIG. 9 shows a comparison between the reachability of foldable arms of robotic assistants with and without actuated feet of FIG. 4.

With reference to FIG. 9, the arrangement of the actuated feet 15 can also facilitate the increase of reachability of the foldable arm 30. Specifically, compared to a wheeled base without the actuated feet, the wheeled base 10 including the actuated feet 15 enables the foldable arm 30 to have a significant increase in the stable reachable area, which is represented by the curves (see diagrams A and B of FIG. 9) around the wheeled base without the actuated feet and the wheeled base 10 including the actuated feet 15. It should be noted that the four actuated feet 15 can be omitted in one embodiment when the wheeled base 10 does not include any suspension systems.

Figure 11:
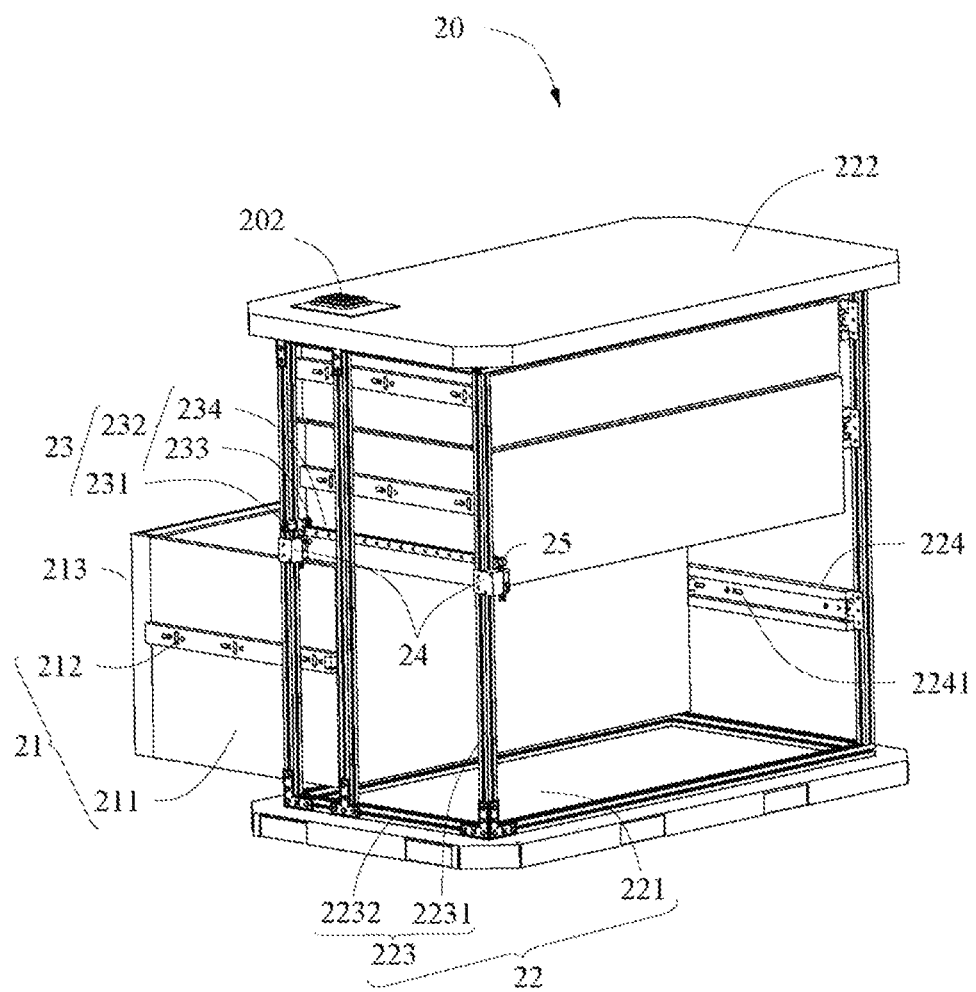
FIG. 11 is an isometric view of a drawer mechanism of the robotic assistant according to one embodiment.

With reference to FIG. 11, the drawer mechanism 20 includes a housing 22 enclosing the drawers 21. In one embodiment, the housing 22 includes a body 223, a bottom plate 221, and a top plate 222. The bottom plate 221 and the top plate 222 are fixed to the bottom and the top of the frame 223, respectively. In one embodiment, the body 223 is a frame that includes a number of substantially vertical bars 2231 that are connected to one another via a number of connection bars 2232. The bottom plate 221 and the top plate 222 are fixed to the connection bars 2232. In an alternative embodiment, the vertical bars 2231 may be directly connected to the bottom plate 221 and the top plate 222. In another embodiment, the housing 22 may be made of bent sheet metals. In yet another embodiment, the body 223 may be a structure frame made of bent sheet metal ribs, which are secured to metal sheets to reduce weight without compromising rigidity.

With reference to FIG. 11, the drawers 21 are slidable with respect to the housing 22. In one embodiment, the housing 22 further includes a number of slide rails 224 that are fixed to the vertical bars 223 to provide support to the drawers 21. Each slide rail 224 extends in a substantial horizontal direction and defines a slot 2241 extending along the lengthwise direction of the slide rail 224. Correspondingly, each drawer 21 includes a main body 211 and two sliders 212 on opposite sides of the main body 211. The sliders 212 extend in a substantially horizontal direction and are respectively fit in and slidable in the slots 2241 of two slide rails 224. With such arrangement, each drawer 21 can slide with respect to the housing 22 between an open position (see FIG. 11) and a closed position (see FIG. 1).

With reference to FIG. 11, in one embodiment, the drawer mechanism 20 further includes a number of driving devices 23 for respectively driving the drawers 21 to slide between their open positions and closed positions. Each driving device 23 includes a motor 231 fixed to one of the vertical bars 2231 and a transmission device 232 for converting rotational motion from the motor 231 into sliding motion. In one embodiment, the transmission device 232 includes an output gear 233 fixed to the output shaft of the motor 231 and a rack 234 fixed to one side of the main body 211 of the drawer 21. The rack 234 is substantially parallel to one slider 212 that is fixed to the same side of the main body 211, and engaged with the output gear 233. When the output gear 233 rotates together with the output shaft of the motor 231, the rack 234 moves and drives a corresponding drawer 21 to slide with respect to the housing 22.

With reference to FIG. 11, in one embodiment, the drawer mechanism 20 further includes two limit switches 24 for each drawer 21. The two limit switches 24 are respectively fixed to two vertical bars 2231 and can come into contact with a block 25 that can be fixed to and slidable together with the rack 234 or the main body 211 of one drawer 21. When one of the limit switches 24 come into contact with the block 25, it sends a signal to a motor controller which in turn stops rotation of the motor 231. The movement of the drawer 21 is thus stopped. With such arrangement, the travel limits of the drawers 21 can be monitored and the motors 231 are de-energized when the travel limits of the drawers 21 have been reached. It should be noted that other type of limit switches which require no physical contact for activation may be used according to actual needs. In another embodiment, the driving motors of the driving devices may include an absolute encoder attached to determine the precise location of the drawer.

In one embodiment, collision detecting sensors, such as force sensitive resistors and tactile sensors, can be disposed on the robotic assistant 100, such as on the front surfaces 213 and inner surfaces 214 of the drawers 21. If a collision is detected (e.g., someone bumping into the robotic assistant 100), the collision detecting sensors can send signals to the motor controller, which in turn, deactivate power to the motors 231, which can prevent the motors 231 from being damaged. Furthermore, other non-contact sensors, such as distance sensors and safety light curtains, can be disposed on the drawers 21 to determine potential collision, such that the drawers 21 open only when there is sufficient space to open. Alternatively, the collision can be detected by sensing the current of the motor and setting a threshold to determine whether a collision has been detected or not during the drawer opening operation. On the other hand, when the drawers 21 are closing, potential blockage caused by human fingers or objects that are not properly inserted in the drawers 21 can be detected. In this case, the motion of the drawers 21 may be stopped.

Figure 12:
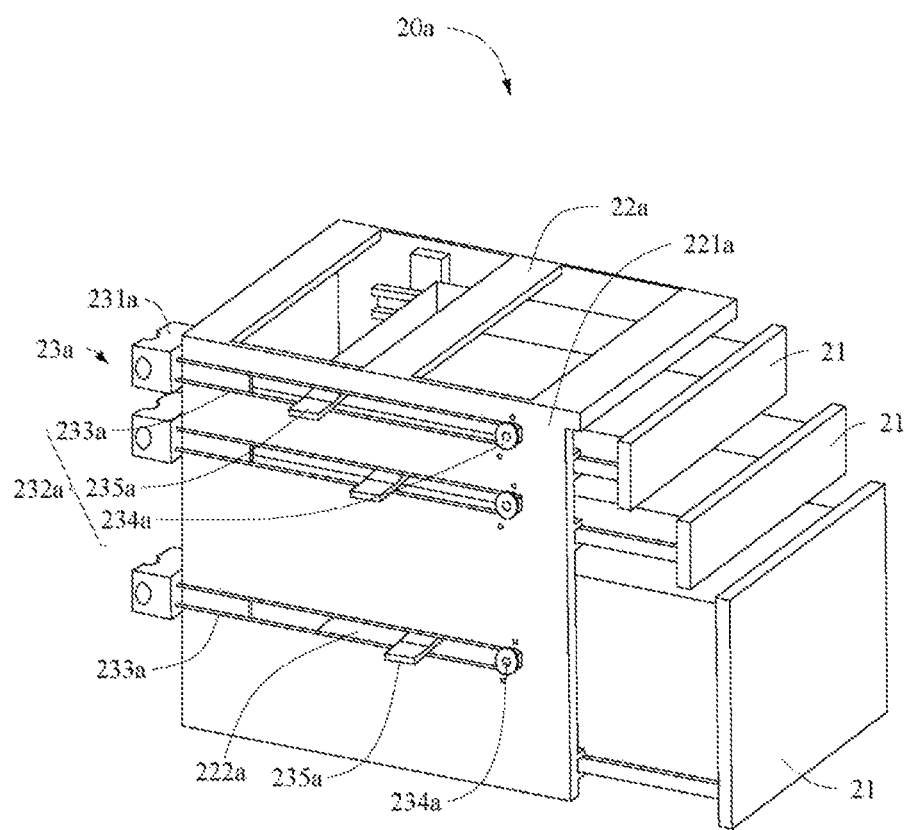
FIG. 12 is an isometric view of the drawer mechanism of the robotic assistant, viewed from a different perspective, according to another embodiment.

FIG. 12 shows a drawer mechanism 20a according to an alternative embodiment, which differs from the drawer mechanism 20 in that the drawer mechanism 20a includes a housing 22a and a driving device 23a. The housing 22a includes two side panels 221a, where the drawers 21 are connected to and slidable with respect to the side panels 221a in a similar mechanism described above. Each driving device 23a includes a motor 231a and a transmission device 232a including a timing belt 233a, a pulley 234a rotatably connected to one side panel 221a, and a rack 235a fixed to one drawer 21 and protruding out of a longitudinal slot 222a defined in the side panel 221a where the pulley 234a is located. The timing belt 233a is arranged around the pulley 234a and an output gear connected to the output shaft of the motor 231a, and engaged with the rack 235a. When the output gear rotates, the timing belt 233a moves and drives the rack 235a to move. The drawer 21a then slides with respect to the housing 22a between an open position and a closed position. It should be noted that the actuation mechanism for moving the drawers 21 is not limited to the embodiments above and can change according to actual needs. For example, linear actuators can be used to move the drawers 21 between an open position and a closed position.

It should be noted that the actuation mechanism for driving the drawers 21 is not limited to the embodiments as shown in FIGS. 11 and 12, and can change according to actual needs. In one example, a piston-like linear actuator can be used to drive each of the drawers 21. The linear actuator can be disposed under the drawer 21, with the drawer 21 fixed to the shaft of the linear actuator. The drawer 21 can slide together with the shaft of the linear actuator. In another example, a stepper motor can be used to drive each of the drawers 21. The stepper motor may include a lead screw and a nut that is slidable along the lead screw. The drawer 21 can be fixed to the nut and slidable along the lead screw when the lead screw rotates. In yet another example, the actuation mechanism may include a motor and a friction wheel fixed to the output shaft of the motor. The friction wheel can be disposed under each drawer 21 and stay in contact with the bottom surface of the drawer 21. When the friction wheel rotates, it can drive the drawer 21 to slide with respect to the housing 22.

In one embodiment, as shown in FIGS. 11 and 12, three drawers 21 are stacked on top of one another in the vertical direction within the housing of the drawer mechanism 20. However, the number and the arrangement of the drawers 21 may be adjusted according to actual needs. For example, the drawer mechanism 20 may include only one drawer 21, or two drawers 21 arranged side by side.

In one embodiment, the drawer mechanism 20 may further include an ID checking module. In one example, the ID checking module may include a keypad 202 (FIG. 11) to allow a passcode to be entered, a card reader, a face recognition camera, or the like. With the ID checking module, the robotic assistant can allow access to the stored items by authorized personnel.

Figure 13:
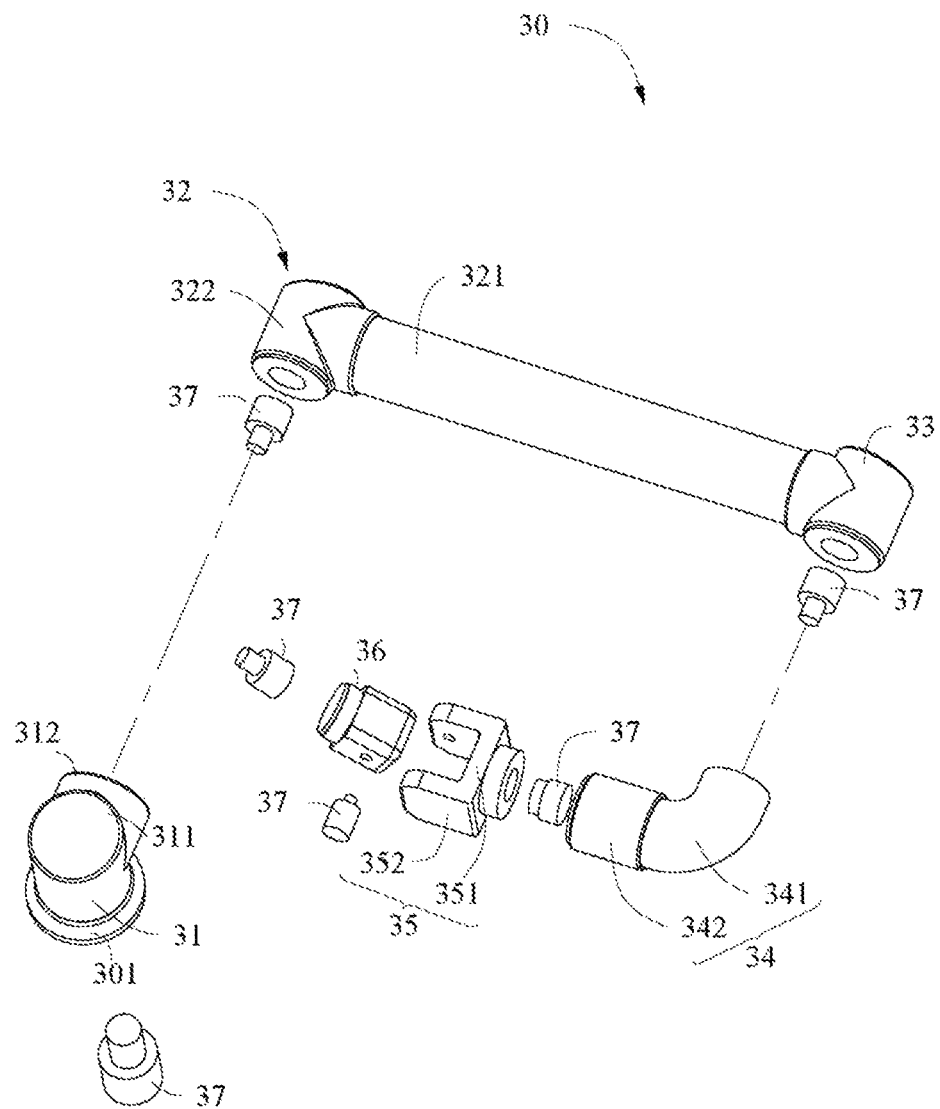
FIG. 13 is an isometric exploded view of a foldable arm of the robotic assistant of FIG. 1B according to one embodiment.

With respect to FIG. 13, in one embodiment, the foldable arm 30 is an articulated arm having single axis revolute type joints. This chain of revolute joints provides great freedom and dexterity in movement of the foldable arm. It should be noted that the configuration of the foldable arm 30 may change according to need. For example, the foldable arm 30 may be a selective compliant articulated robot arm (SCARA) in an alternative embodiment.

In one embodiment, the foldable arm 30 includes a first link 31, a second link 32, a third link 33, a fourth link 34, a fifth link 35, and a sixth link 36. The foldable arm 30 further includes six revolute joints 37 for providing rotary motion to the links above. In one embodiment, the second link 32, a third link 33, a fourth link 34, a fifth link 35, and a sixth link 36 are rotatably connected to one another, in series, through five of the revolute joints 37 ("first revolute joints 37"). The first link 31 is substantially vertical and rotatably connected, via the rest revolute joint ("second revolute joint 37"), to a base 301 fixed to the top of the drawer mechanism 20. In an alternative embodiment, the base 301 may be omitted and the first link 31 may be directly rotatably connected to the top of the drawer mechanism 20. The first link 31 is rotatable with respect to the top of the drawer mechanism 20 about a substantially vertical axis. The first link 31 may be hollow and receives the second revolute joint 37.

In one embodiment, the first link 31 includes a vertical body 311 and a connection portion 312 protruding from a lateral surface of the vertical body 311. The second link 32 is rotatably connected to the connection portion 312 and rotatable about an axis that is substantially perpendicular to the vertical body 311. In one embodiment, the second link 32 includes an elongated body 321 and a connection portion 322 connected to a first end of the elongated body 321. One of the connection portion 312 of the first link 31 and the connection portion 322 of the second link 32 receives one first revolute joint 37 and the other is fixed to the output shaft of the first revolute joint 37, which rotatably connects the second link 32 to the first link 31. In one embodiment, the second link 32 is rotatable about an axis that is substantially perpendicular to the elongated body 321.

In one embodiment, one end of the third link 33 is fixed to a second end of the elongated body 321 of the second link 32 opposite the connection portion 322.

Figure 14A:
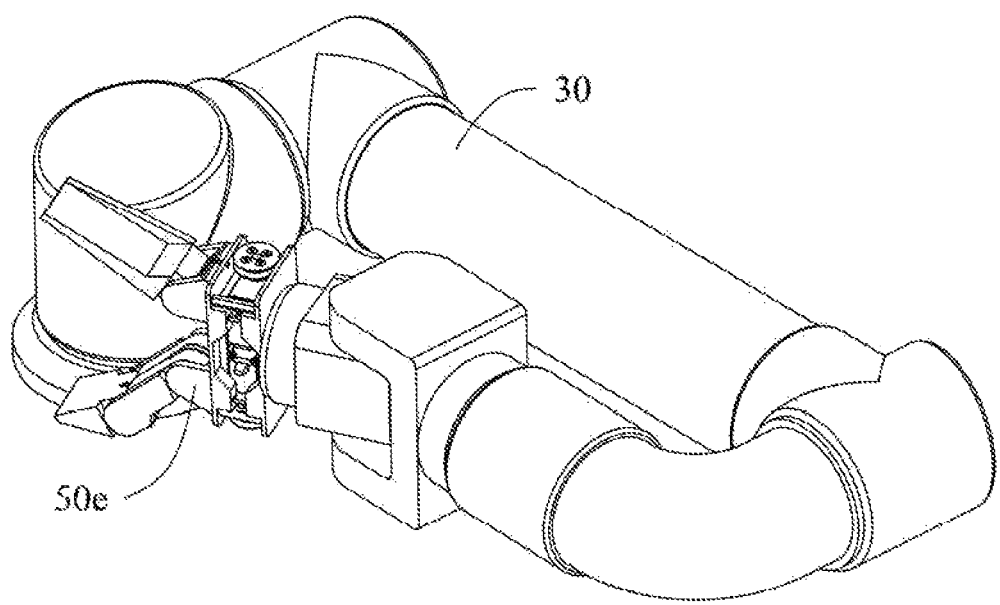
FIG. 14A is an isometric view of the foldable arm of FIG. 13, with an end of arm tooling (EOAT) or EOAT robotic gripper, according to one embodiment, in an original flat state.
Figure 14B:
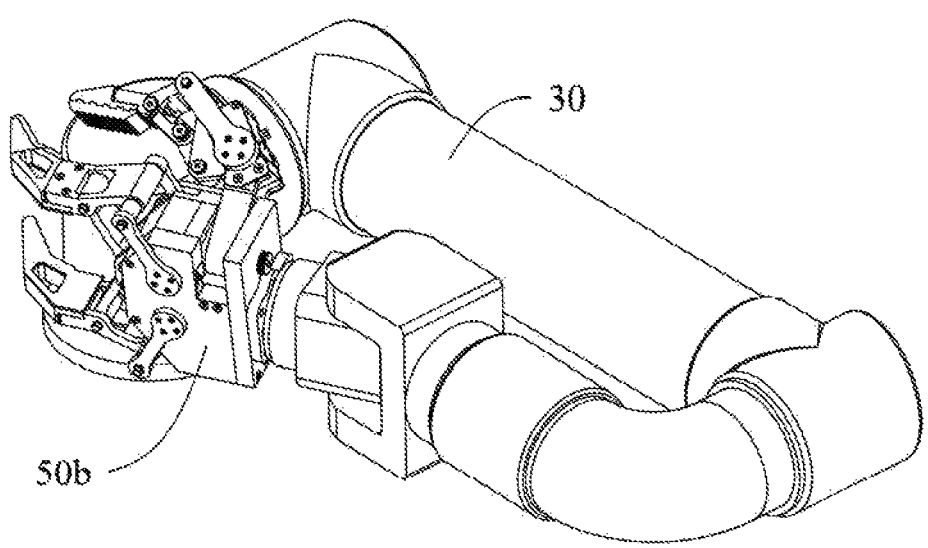
FIG. 14B is an isometric view of the foldable arm of FIG. 13, with the EOAT, according to another embodiment, in an original flat state.
Figure 14C:
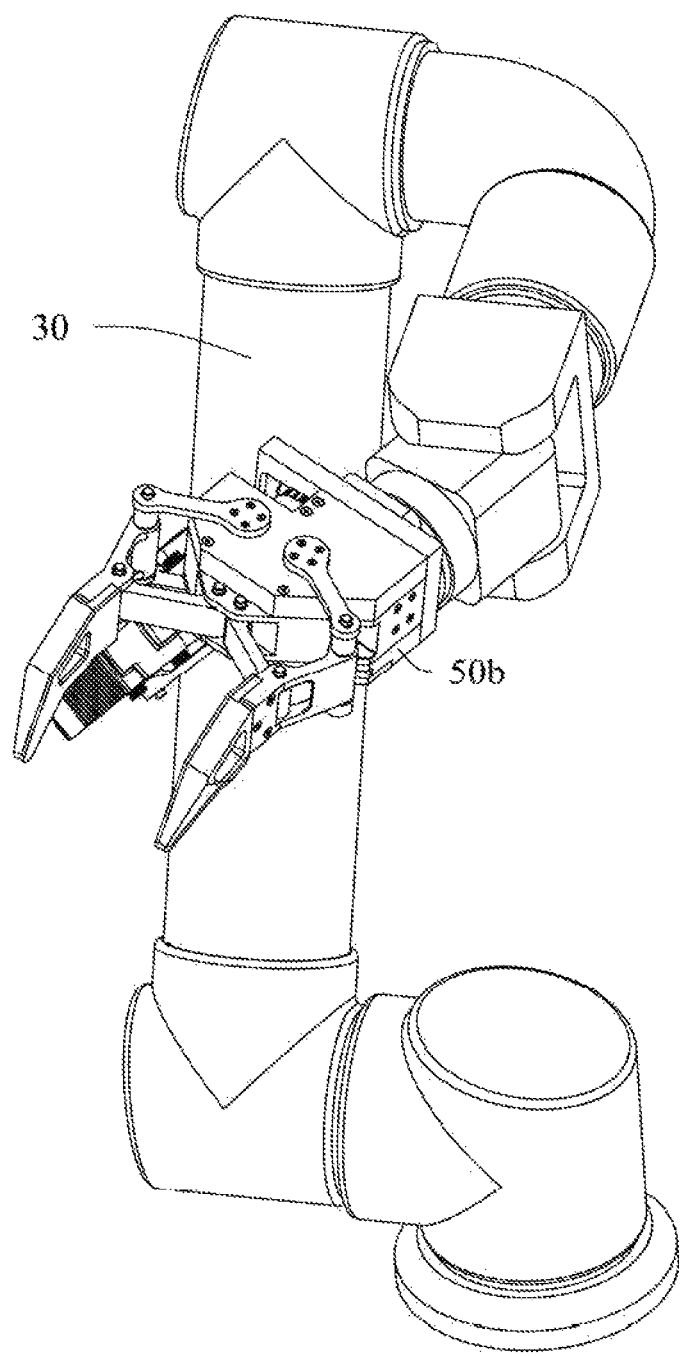
FIG. 14C is an isometric view of the foldable arm of FIG. 14B in an intermediate state.
Figure 14D:
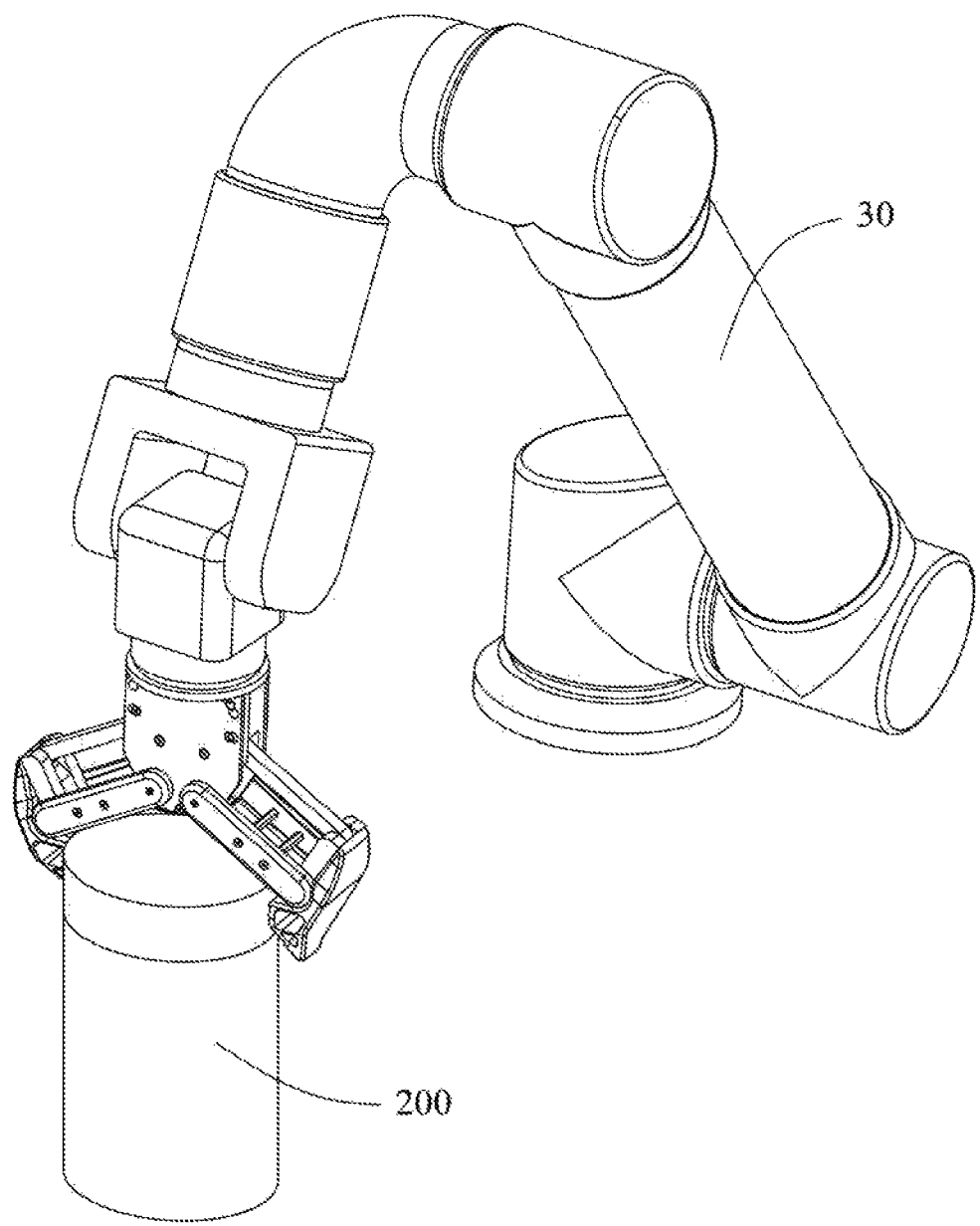
FIG. 14D is an isometric view of the foldable arm of FIG. 14B in a final state when grasping an object.

In one embodiment, the fourth link 34 includes a curved body 341 and a connection portion 342 connected to one end of the curved body 341. One of the third link 33 and the curved body 341 receive one first revolute joint 37 and the other is fixed to the output shaft of the first revolute joint 37, which rotatably connects the fourth link 34 to the third link 33. The fourth link 34 is rotatable about an axis that is substantially perpendicular to the lengthwise direction of the elongated body 321 of the second link 32. As shown in FIGS. 14A and 14B, with the arrangement of the curved body 341, the EOAT, the sixth link 36, the fifth link 35, and the fourth link 34 can be moved to a position adjacent to the first link 31 and the elongated body 321 of the second link 32. As a result, the foldable arm 30, as a whole, can be actuated to fold in a compact and substantially flat state on top of the drawer mechanism 20. This saves valuable real estate in the horizontal and vertical direction. As noted above, a visor/guard may be used to partially or fully enclose the foldable arm 30 when the foldable arm 30 is in the folded position. The visor/guard may be retractable from an open position to a closed position.

In one embodiment, the fifth link 35 is substantially U shaped and includes a base 351 and two sidewalls 352 connected to the base 351. The connection portion 342 of the fourth link 34 receives one first revolute joint 37 and the base 351 is fixed to the output shaft of the first revolute joint 37, which rotatably connects the fifth link 35 to the fourth link 34. The fifth link 35 is rotatable about an axis that is substantially perpendicular to the rotation axis of the fourth link 34.

In one embodiment, the sixth link 36 is partly received in the space defined by the base 351 and the two sidewalls 352. The sixth link 36 is rotatably connected to the sidewalls 352 through one first revolute joint 37. The sixth link 36 is rotatable about an axis that is substantially perpendicular to the rotation axis of the fifth link 35. The sixth link 36 further receives therein one first revolute joint 37 that rotatably connects the EOAT 50 to the sixth link 36. The EOAT 50 is rotatable about an axis that is substantially perpendicular to the rotation axis sixth link 36. The revolute joint 37 connecting the EOAT 50 to the sixth link 36, the revolute joint 37 connecting the sixth link 36 to the fifth link 35, and the revolute 37 connecting the fifth link 35 to the fourth link 34, form a ball joint.

In one embodiment, each revolute joint 37 may be a motor assembly including a motor, an encoder, a motor controller, a transmission device, and a brake. The encoder provides closed loop feedback signals by tracking the speed and/or position of the output shaft of the motor. The transmission device is configured to transmit motion from the motor to one link that is driven by the motor assembly. The brake is configured to lock the link that is driven by the motor assembly in place such that the foldable arm 30 can be locked in place in the case of power failure or other technical glitches. It should be noted that revolute joints for robotic arms are well developed and the configuration of the revolute joints 37 may change according to actual needs.

It should be noted that the number, length, and arrangement of the links and the revolute joints may change according to actual needs. For example, the foldable arm 30 may have more or less freedoms, which requires more or less links and revolute joints. Specifically, the foldable arm 30 includes N links, M first revolute joints, and a second revolute joint. The N links are rotatably connected to one another, in series, through the M first revolute joints, and a first of the N links is rotatably connected to the drawer mechanism 20 through the second revolute joint, where N is a natural number greater than two, and N=M+1.

Each of the revolute joints 37 can be independently controlled, which enables the foldable arm 30 to be in various determined poses during object manipulation tasks. For example, FIGS. 14A to 14D show the change of the state of the foldable arm 30 during a pickup task, including an original compact and substantially flat state (FIGS. 14A and 14B), an intermediate state (FIG. 14C), and a final pose (FIG. 14D) to grasp a determined object 200. In the original compact and substantially flat state, the foldable arm 30 can be even with the rim of the visor/guard, or the guard can be fully retracted. This may allow for a maximum working reachability for the foldable arm 30.

Figure 15A:
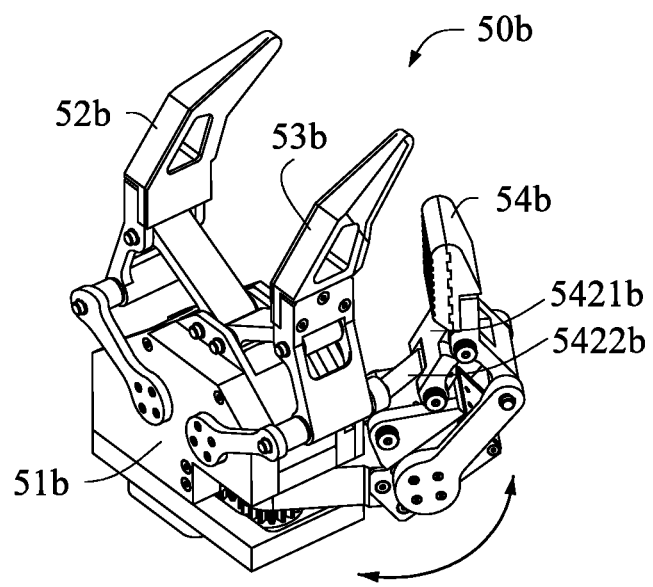
FIG. 15A is an isometric view of another embodiment of an EOAT of the robotic assistant according to one embodiment.
Figure 15C:
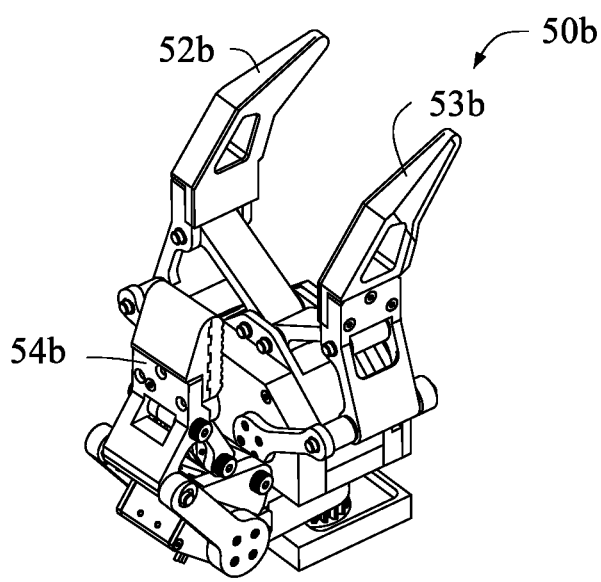
FIG. 15C is an isometric view of the EOAT of FIG. 15A.
Figure 15B:
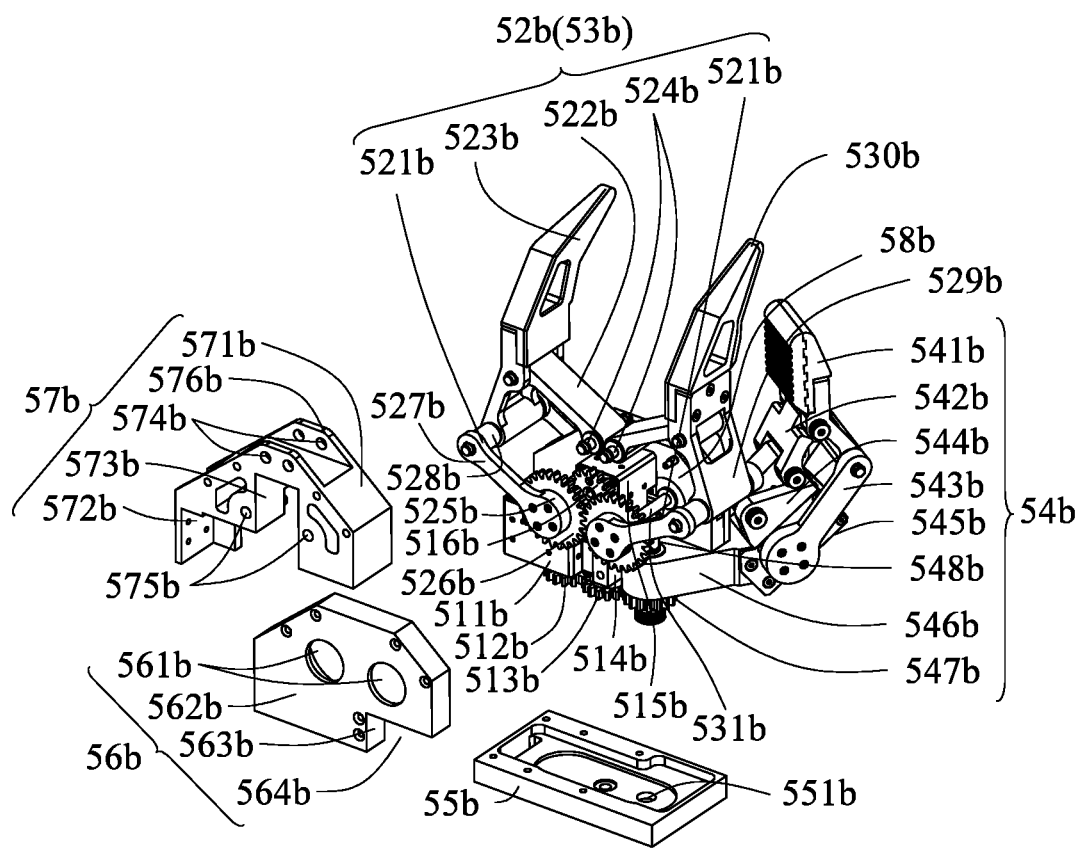
FIG. 15B is an isometric exploded view of the EOAT of FIG. 15A.

With reference to FIGS. 15A to 15C, in one embodiment, an EOAT 50*b* includes two parallel jaw fingers 52*b* and 53*b* and an adaptive thumb 54*b*. This configuration allows for both precision pinch grasps using only the two parallel jaw fingers 52*b*, 53*b* as well as a grasp for larger, heavier objects when the thumb 54*b* is engaged and fingers 52*b* and 53*b* are jointed together or separated from each other. Specifically, the EOAT 50*b* further includes a base 51*b* where the fingers 52*b* and 53*b* and the thumb 54*b* are connected. The base 51*b* includes a bottom plate 55*b*, a front cover 56*b* and a rear cover 58*b* that are spaced from each other and fixed to the bottom plate 55*b*, and an internal support 57*b* fixed to and located between the front cover 56*b* and he rear cover 58*b*. In one embodiment, the fingers 52*b* and 53*b* have the same configuration and each of the fingers 52*b* and 53*b* and the base 51*b* form a four-bar linkage mechanism. Specifically, each of the fingers 52*b* and 53*b* includes a crank 521*b*, a rocker 522*b*, and a coupler 523*b*.

With reference to FIG. 15B, in one embodiment, the crank 521*b* includes two bars 527*b* that are spaced apart from and parallel to each other. The two bars 527*b* have substantially the same configuration and are connected to each other, at their first ends, through a shaft 528*b*. The two bars 527*b* are rotatably connected to the front cover 56*b* and the rear cover 58*b*, respectively, at their second ends, which allows the two bars 527*b* to rotate about one common axis. In one embodiment, one axle 525*b* is fit in each through hole 561*b* defined in a main body 562*b* of the front cover 56*b*. The other bar 527*b* can be rotatably connected to the rear cover 58*b* in the same way, which is not repeated here. The rocker 522*b* is rotatably connected to the internal support 57*b* and the coupler 523*b*, respectively, at its opposite ends. In on embodiment, the internal support 57*b* includes a main body 571*b* and two spaced tabs 576*b* protruding on the top of the main body 571*b*. Each rocker 522*b* is rotatably connected to the tabs 576*b* by a shaft 524*b* whose opposite ends extend out of the rocker 522*b* and are received in the through holes 574*b* defined in the tabs 576*b*.

With reference to FIG. 15B, in one embodiment, the coupler 523*b* includes a connection bar 529*b* and a fingertip 530*b*. One end of the connection bar 529*b* is rotatably connected to the two bars 527*b* through the shaft 528*b*, and the opposite end of the connection bar 529*b* is rotatably connected to the rocker 522*b*. The fingertip 530*b* is fixed to the connection bar 529*b* adjacent to the opposite end of the connection bar 529*b*. In one embodiment, one bar 527*b* rotates when driven by a motor 515*b*, and drives the coupler 523*b* and the rocker 522*b* to rotate. The grippers 523*b* of the two fingers 52*b* and 53*b* can then move toward/away from each other, which allows the grippers 523*b* to grasp/release objects. In the embodiment, the crank 521*b*, the rocker 522*b*, and the coupler 523*b* are configured in such a way that the grippers 523*b* stay substantially parallel to each other during their movement toward/away from each other. In one embodiment, the fingertips 530*b* each have a curved configuration which allow for non-prehensile tasks, such as pulling on handles, hoisting an object with a loop feature or repositioning objects.

With reference to FIG. 15B, in one embodiment, the motor 515*b* is received in a space 573*b* defined in the main body 571*b* of the internal support 57*b*. A transmission mechanism transmits motion from the motor 515*b* to the two bars 527*b* of the fingers 52*b* and 53*b*. The transmission mechanism includes an output gear 516*b* fixed to the output shaft of the motor 515*b*, and two gears 526*b* rotatably arranged around the axles 525*b*. The two bars 527*b* are fixed to the two gears 526*b*. In one embodiment, one of the two gears 526*b* is a stepped gear that includes a large gear engaged with the other gear 526*b*, and a small gear engaged with the output gear 516*b*. When the output gear 516*b* rotates, the small gear is driven to rotate and the large gear rotates synchronously and drives the other gear 526*b* to rotate. The two gears 526 then drives two bars 527*b* of the fingers 52*b* and 53*b* to rotate. In one embodiment, the EOAT 50*b* may further include two shafts 531*b* rotatably passing through two through holes 575*b* defined in the main body 571*b* of the internal support 57*b*. Two bars 527*b* of the finger 52*b* are respectively fixed to the opposite ends of one shaft 531*b*, and two bars 527*b* of the finger 53*b* are respectively fixed to the opposite ends of the other shaft 531*b*.

With reference to FIG. 15B, in one embodiment, the thumb 54*b* includes a base 546*b*, a motor assembly 545*b*, a crank 543*b*, a coupler 541*b*, and a rocker 542*b*. The base 546*b* is connected to the bottom plate 55*b*. The lower end of the crank 543*b* is fixed to the output shaft of the motor assembly 545*b*, and the upper end of the crank 543*b* is rotatably connected to the lower end of the coupler 541*b*. The lower end of the rocker 542*b* is rotatably connected to a connection member 544*b* fixed to the top of the motor assembly 545*b*. The upper end of the rocker 542*b* is rotatably connected to the coupler 541*b*. The crank 543*b* rotates when driven by the motor assembly 545*b*, and drives the coupler 541*b* to rotate toward/away from the two fingers 52*b* and 53b. The thumb 54b can then work with the fingers 52b and 53b to grasp larger, heavier objects.

With reference to FIG. 15B, in one embodiment, the thumb 54b is rotatably connected to the bottom plate 55b. The main body 562b of the front cover 56b defines a space 563b in a lower corner. The top surface 564b of the space 563b, a bottom surface of the internal support 57b and a bottom surface of the rear cover 58b are substantially flush with each other. Theses surfaces face the bottom plate 55b and a receiving space is formed between these surfaces and the bottom plate 55b, which allows the base 546b of the thumb 54b to rotate in the receiving space. Specifically, the base 546b is partly received in the receiving space and rotatably connected to the bottom plate 55b through a shaft 548b. A lower end of the shaft 548b is rotatably fit in a through hole 551b defined in the bottom plate 55b, and a top end of the shaft 548b is rotatably received in a hole defined in the internal support 57b. The shaft 548b is substantially vertical, and the base 546b is thus rotatable about a vertical axis. FIG. 15A shows that the thumb 54b is in a first position, while FIG. 15C shows that the thumb 54b has rotated from the first position to a second position to free up operating space for fingers 52b and 53b. In one embodiment, the rocker 542b is a spring-loaded, two-link component. Specifically, the rocker 542b includes a first member 5421b and a second member 5422b that is rotatably connected to the first member 5421b. The rocker 542b passively reconfigures when it makes contact with an object. After the object has been released, the first member 5421b and the second member 5422b return to their original positions by a spring. With such configuration, the thumb 54b can rotate to various positions to adapt different objects having different shape and size, which enable the EOAT 50b to have great versatility to grasp different objects. In one embodiment, sensors may be embedded into fingers 52b, 53b and 54b for additional robustness of grasping.

With reference to FIG. 15B, in one embodiment, the EOAT 50b further includes a motor 511b fixed to the internal support 57b and received in a space 572b defined in the internal support 57b. Motion from the motor 551b is transmitted to the base 546 of the thumb 54b by an output gear 512b fixed to the output shaft of the motor 511b, an intermediate gear 513b that is rotatably connected to a block 514b fixed to the front cover 56b and engaged with the output gear 512b, and a gear 547b that is fixed to the shaft 548b and engaged with the intermediate gear 513b.

With reference to FIGS. 16A to 16C, in one embodiment, an EOAT 50c includes base 51c and three fingers 52c rotatably connected to the base 541c. The base 51c includes a bottom plate 511c, an intermediate plate 512c, and a top plate 513c that are spaced apart from one another in a vertical direction, and connected to one another via a number of vertical bars 514c. The EOAT 50c further includes a linear stage 55c that is connected to a post 56c fixed to the bottom plate 511c and the top plate 513c. The post 56c is substantially vertical and the linear stage 55c is slidable along the post 56c. The linear stage 55c is arranged between the intermediate plate 512c and the top plate 513c. The EOAT 50c further includes three couplers 54c that each include opposite ends rotatably connected to the linear stage 55c and one finger 52c. Each finger 52c is further rotatably connected to the top plate 513c.

With reference to FIG. 16A, when the linear stage 55c moves up and down, the fingers 52c are driven to rotate toward/away from one another, which enables the fingers 52c to grasp/release objects. In one embodiment, the EOAT 50c further includes a linear motor 53c arranged between the bottom plate 511c and the intermediate plate 512c. The linear stage 55c is fixed to the slider that connected to the output shaft of the linear motor 53c. The linear stage 55c moves up/down together with the slider when the output shaft of the linear motor 53c rotates. In one embodiment, the fingers 52c can be made of elastic material and passively deform and cage around smaller objects for a more secure grasp. In one embodiment, sensors may be embedded into fingers 52c. The use of elastic material as a monolithic structure may increase robustness.

Figure 17:
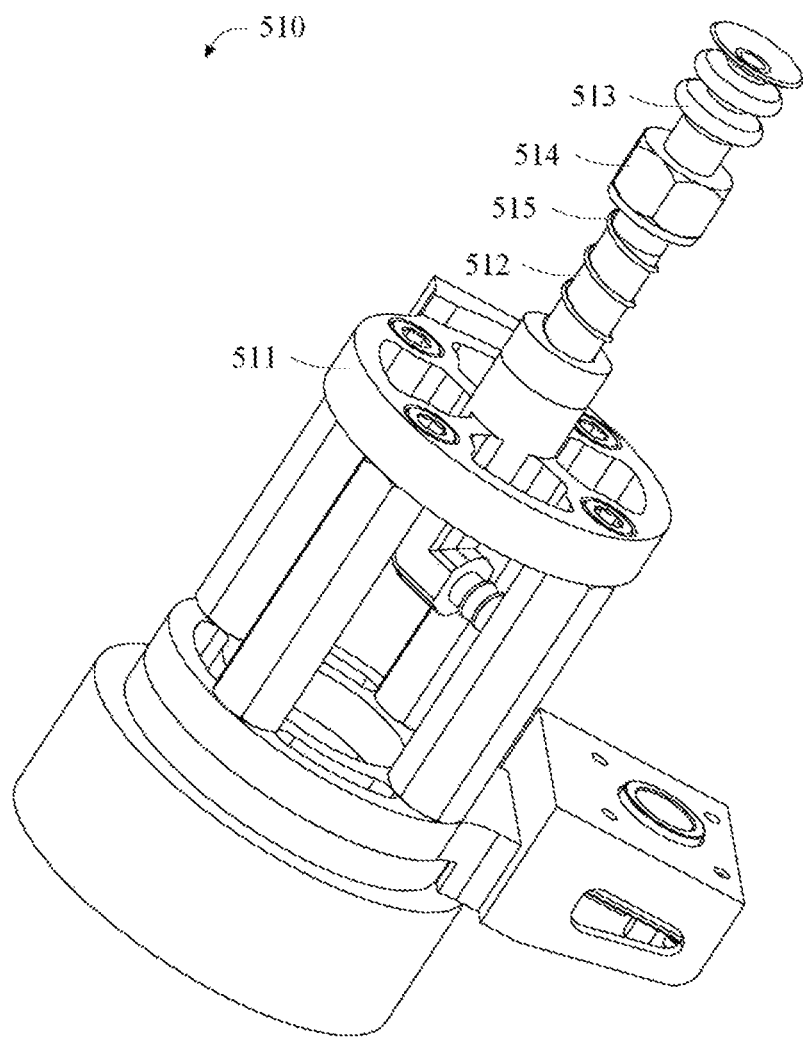
FIG. 17 is an isometric exploded view of a vacuum module EOAT of the robotic assistant according to one embodiment.

With reference to FIG. 17, in one embodiment, the robotic assistant 100 may further include a vacuum module 510 that can be fixed to the EOATs described above. The vacuum module 510 includes a base 511, a connection tube 512, and a soft rubber, plastic, or elastic suction cup 513. The suction cup 513 is configured to be pressed onto an object by pushing downward, which creates a seal as the air under the suction cup is expelled, thereby provide a lifting force to the object. The vacuum module 510 can be used as a standalone picking tool or to aid in non-prehensile (pushing/pulling) tasks that puts target objects in a more advantageous pose to be grasped by the jaws/fingers of the EOAT 50. In one embodiment, the suction cup 513 is connected to and slidable along the connection tube 512 via a nut 514. The nut 514 is connected to the base 511 through a spring 515 arranged around the connection tube 512. When the suction cup 513 is pressed onto an object, the nut 514 pushes and compresses the spring 515 which in turn pushes the suction cup 513 to tightly abut against the object.

With to FIGS. 18A to 18D, in one embodiment, the robotic assistant 100 further includes a camera 61. The camera 61 assists the robotic assistant 100 to perceive environment and guide the foldable arm 30 to conduct object manipulation tasks. In one embodiment, the control system 70 of the robotic assistant directs the foldable arm 30 to be in a determined orientation by articulation of one or more of the N revolute joints and N links of the foldable arm 30, and directs the EOAT 50 to pick up and place external objects from/to the one or more drawers 21 based on output from the camera 61 according to command instructions.

Figure 18A:
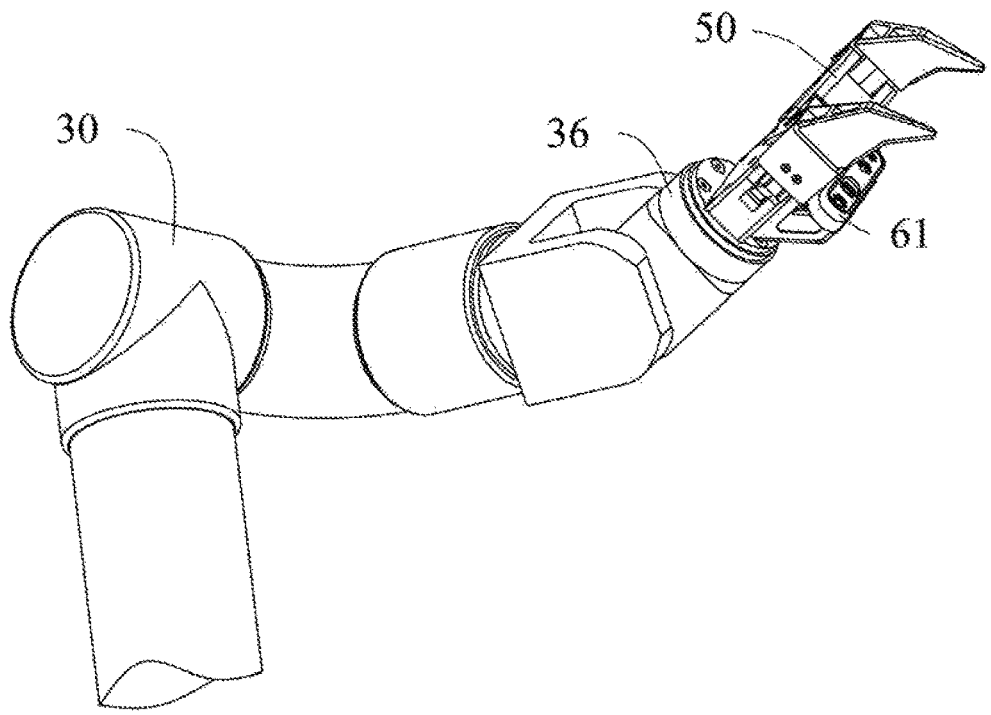
FIG. 18A shows a camera mounted to the EOAT of the foldable arm of FIG. 13.
Figure 18B:
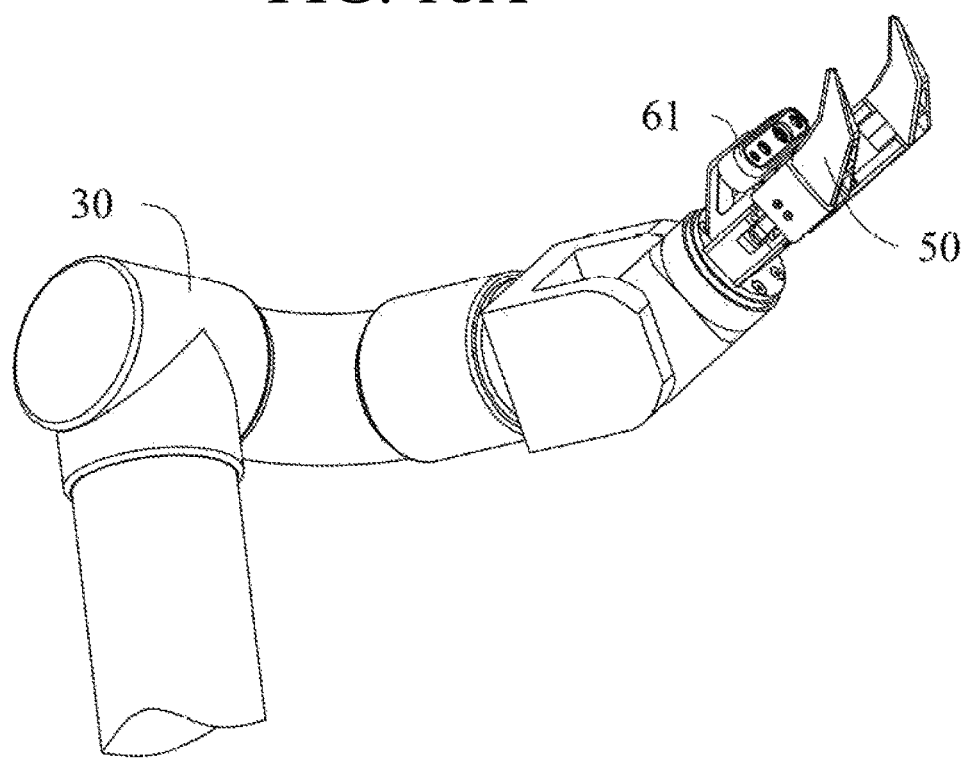
FIG. 18B is similar to FIG. 18A and shows the EOAT mounted with a camera and rotated to a different orientation.
Figure 18C:
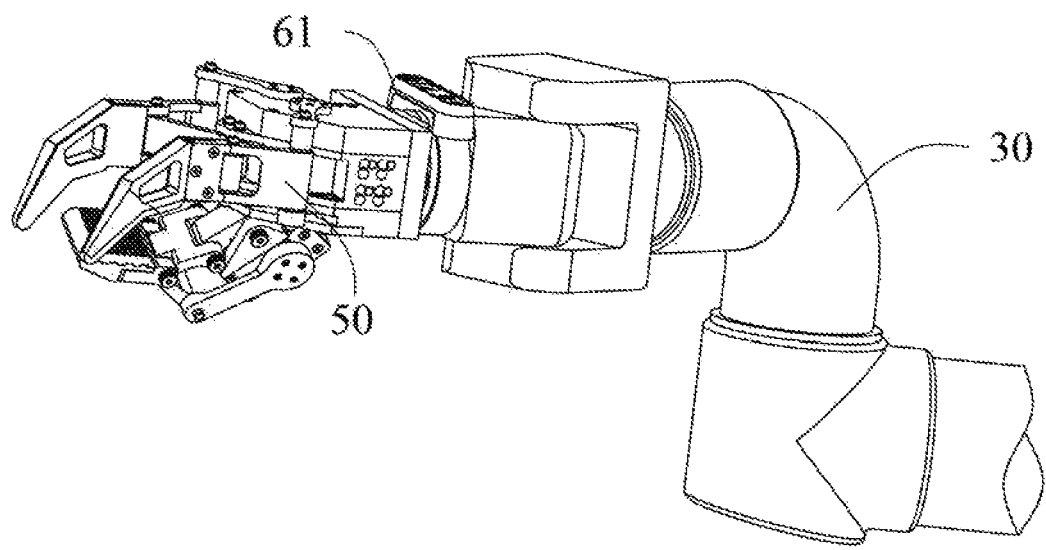
FIG. 18C shows a camera connected to the foldable arm of FIG. 13 adjacent to the EOAT of the robotic assistant.
Figure 18D:
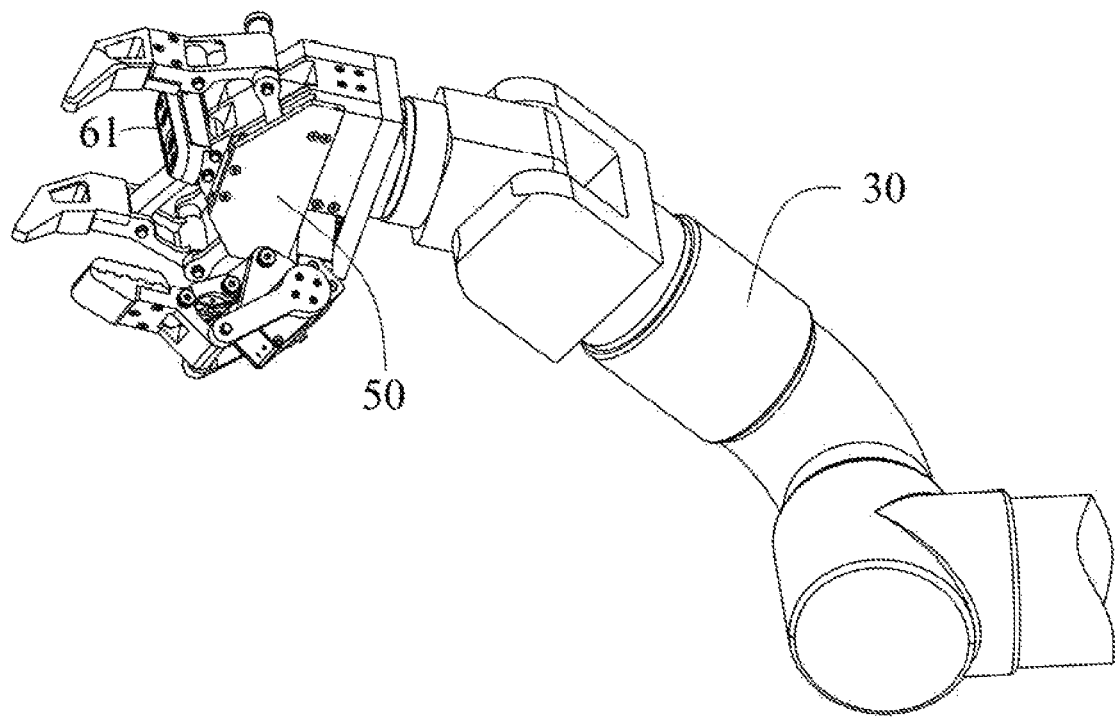
FIG. 18D shows a camera connected to the EOAT of the robotic assistant.

In one embodiment, the camera 61 may be a wrist-mounted camera. Specifically, as shown in FIG. 18C, the camera 61 is connected to the lateral surface of the output disc of the revolute joint 37 received in the sixth link 36 of the foldable arm 30 next to the EOAT 50 that is connected to the end surface of the output disc of the revolute joint 37 received in the sixth link 36. In the wrist-mounted configuration, the camera 61 is able to view the task environment with as little obstruction from the manipulation system as possible, while minimizing the overall footprint. It should be noted that the camera 61 can be disposed on a different position of the foldable arm 30 adjacent to the EOAT 50, or rotatable, according to actual needs. Rotability of the camera 61 can allow the camera to face the grasping working space at all times regardless of placement of the jaw/fingers of the EOAT 50.

In the wrist-mounted designs, termination may end with a revolute joint with a rotational axis parallel to the EOAT "palm" normal vector. However, it may be appreciated that alternative joint designs with additional offsets or a terminating prismatic joint can be considered to minimize singularities in the arm workspace and achieve dual design goals above.

In another embodiment, the camera 61 may be a camera-in-hand or palm-mounted camera. In such a design, the camera may be disposed in the "palm" of the EOAT 50 (i.e., FIG. 18D), or mounted to an external surface of the EOAT 50 (i.e., FIG. 18A and FIG. 18B). This allows for the EOAT to continuously visualize the environment during approach to the object without resetting to a pre-defined configuration for scanning, and allows for persistent view of the object. Persistent view of the task during reach and grasp may be helpful in minimizing pre-grasp pose errors. It should be noted that one or more cameras may be disposed on the ceiling or a high rack of a shelf, such as in a stocking room. In this configuration, the ceiling disposed cameras may provide information a fixed point of visual information of the environment including the foldable arm 30, the shelves, obstacles, and the object to grasp. Use of the ceiling mounted cameras and the camera disposed on/adjacent to the EOAT 50 and/or palm allows for improved object manipulation tasks.

Because of possible near-range object detection issues of vision sensors, it may be difficult to adaptively adjust with respect to the visual feedback as the EOAT gets within a close distance (e.g., 30-50 mm) of the target object. To overcome this limitation, either tactile or close-proximity sensors can be incorporated into the EOAT 50 or in the palm.

In one embodiment, the camera 61 can be a 3D vision system including one or more 3D cameras. In such a configuration, the camera 61 may be chosen from a number of commercially available 3D vision systems, depending on the objects that need to be detected. For example, while laser range finders using time of flight methods can be used to locate distant objects, stereo imaging systems may be better suited to imaging high-contrast objects. In case when objects are highly specular, it may be more useful to employ projected texture techniques, such as structured light. The 3D vision systems for assisting robots to detect and pick up objects are well known and will not be described in detail herein.

Figure 19:
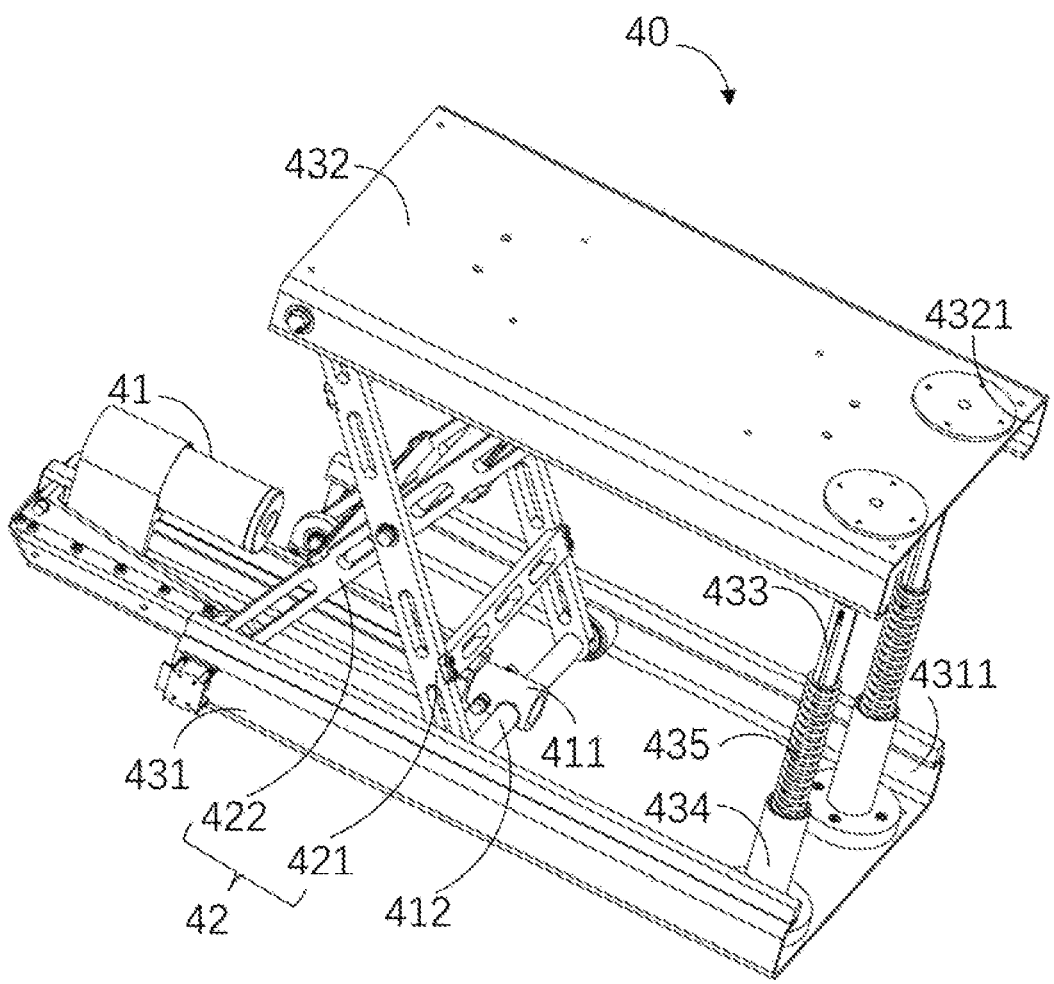
FIG. 19 is an isometric view of an elevation mechanism of the robotic assistant.
Figure 20:
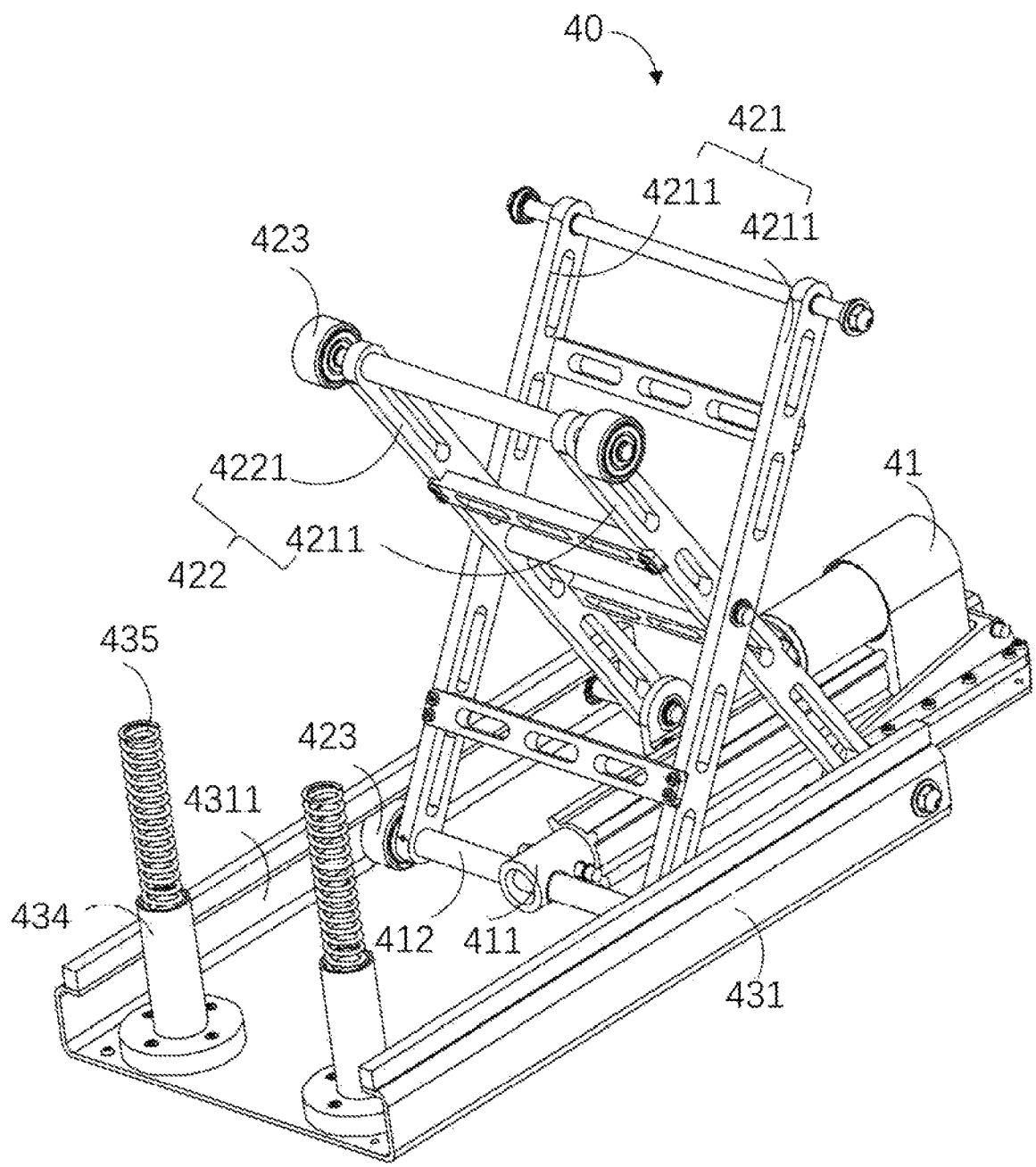
FIG. 20 is an isometric view of the elevation mechanism of FIG. 19 with the top plate detached, viewed from a different perspective.

With reference to FIGS. 19 and 20, in one embodiment, the elevation mechanism 40 is based on a lifting mechanism. Specifically, the elevation mechanism 40 includes a lifting mechanism 42 connected to the drawer mechanism 20 and the wheeled base 10, and an actuator 41 that is fixed to the wheeled base 10 and configured to drive the lifting mechanism 42 to elongate or retract in a vertical direction. The drawer mechanism 20 moves up in the vertical direction when the lifting mechanism 42 elongates, and moves down in the vertical direction when the lifting mechanism 42 retracts. It should be noted that the elevation mechanism 40 is not limited and can be adjusted according to actual needs. In one embodiment, the lifting mechanism may be a scissor lift mechanism.

With reference to FIGS. 19 and 20, the lifting mechanism 42 includes a pair of supports 421 and 422 that are rotatably connected to each other and form a crisscross "X" pattern. The support 421 includes two bars 4211 that have substantially the same length and parallel to and fixed to each other. Top ends of the two bars 4211 are rotatably connected to a top plate 432 where the drawer mechanism 20 is connected. Lower ends of the two bars 4211 are rotatably connected to a bottom plate 431 fixed to the wheeled base 10. In one embodiment, the bottom plate 431 defines two grooves 4311 to receive two wheels 423 rotatably connected to the lower ends of the two bars 4211, respectively. The two wheels 423 are able to roll and move in the two grooves 4311 when the supporting lower ends of the support 421 are driven by the actuator 41. In another embodiment, the two wheels 423 may be replaced by two sliders that are rotatably connected to the lower ends of the two bars 4211, and received in the two grooves 4311. The two sliders are able to slide in the two grooves 4311 when the supporting lower ends of the support 421 are driven by the actuator 41.

With reference to FIGS. 19 and 20, in one embodiment, the support 422 is constructed and arranged in a way similar to the support 421. Specifically, the support 422 includes two bars 4221 that have substantially the same length and parallel to and fixed to each other. One bar 4221 is rotatably connected to one bar 4211 at their middle positions, and the other bar 4221 is rotatably connected to the other bar 4211 at their middle positions. Bottom ends of the two bars 4221 are rotatably connected to the bottom plate 431. Upper ends of the two bars 4221 are movably connected to the top plate 432. In one embodiment, the top plate 432 defines two grooves 4321 to receive two wheels 423 rotatably connected to the upper ends of the two bars 4221, respectively. The two wheels 423 are able to roll and move in the two grooves 4321 when the support 422 is driven by the support 421. In another embodiment, the two wheels 423 may be replaced by two sliders that are rotatably connected to the upper ends of the two bars 4221, and received in the two grooves 4321. The two sliders are able to slide in the two grooves 4321 when the supporting lower ends of the support 421 are driven by the linear rail 41. In another embodiment, the linear rail 41 may be positioned with an angular displacement relative to the bottom plate and the lower ends of the support 422 are located at a displacement away from the end of the bottom plate.

Figure 21:
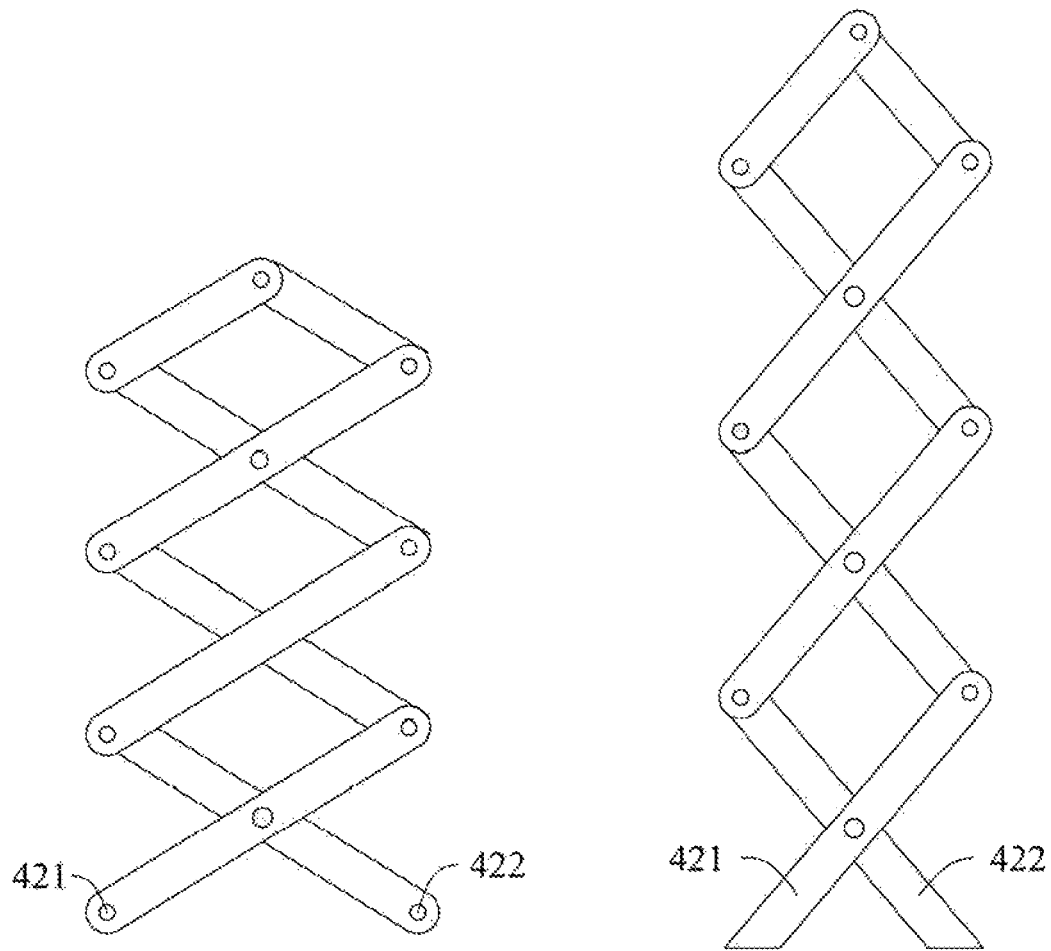
FIG. 21 shows a planar view of a lifting mechanism of the drawer mechanism of FIG. 19.

With such configuration, when the lower ends of the support 421 or the upper ends of the support 422 are pushed/pulled by the actuator 41, the two wheels 423 of the support 421 move in the grooves 4311 or the two wheels 423 of the support 422 move in the grooves 4321. The lifting mechanism 42 then elongates/retracts in the vertical direction, which moves the drawer mechanism 20 to a raised/lowered position. As shown in FIG. 21, it should be noted that the lifting mechanism 42 may include more than one pair of supports 421 and 422. The arrangement of these pairs of supports 421 and 422 is well known and will not be described in detail here.

With reference to FIGS. 19 and 20, in one embodiment, the actuator 41 is a linear actuator configured to apply a pushing force or a pulling force to the lifting mechanism 42 to drive the lifting mechanism 42 to elongate or retract in the vertical direction. The actuator 41 includes an output shaft 411 that is movable in a direction parallel to the grooves 4311 of the bottom plate 431. Lower ends of the bars 4211 of the support 421 are connected to the output shaft 411 through a connection rod 412. The output shaft 411 can then apply a pushing/pulling force to the lower ends of the bars 4211 of the support 421. The wheels of the support 421 can then move in the grooves 4311, which drives the lifting mechanism 42 to elongate or retract. In one embodiment, the elevation mechanism 40 further includes two rods 433 fixed to the top plate 432, and two tubes 434 fixed to the bottom plate 431. The guiding rods 433 are substantially perpendicular to the top plate 432. The tubes 434 are substantially perpendicular to the bottom plate 432, and arranged according to the two rods 433. The elevation mechanism 40 further includes two springs 435. The bottom end of each spring 435 is fixedly received in one tube 434, and each rod 433 is received in one spring 435. When the lifting mechanism 42 is in a fully retracted state, the springs 435 are compressed by the top plate 432. When the lifting mechanism 42 is in a fully elongated state, the springs 435 return to their original form. When the drawer assembly 20 is moving down, the springs 435 are gradually compressed by the top plate 432, which can reduce load acting on the linear rail of the actuator 41. In another embodiment, four springs 435 are disposed at four corners of the bottom plate.

Figure 22:
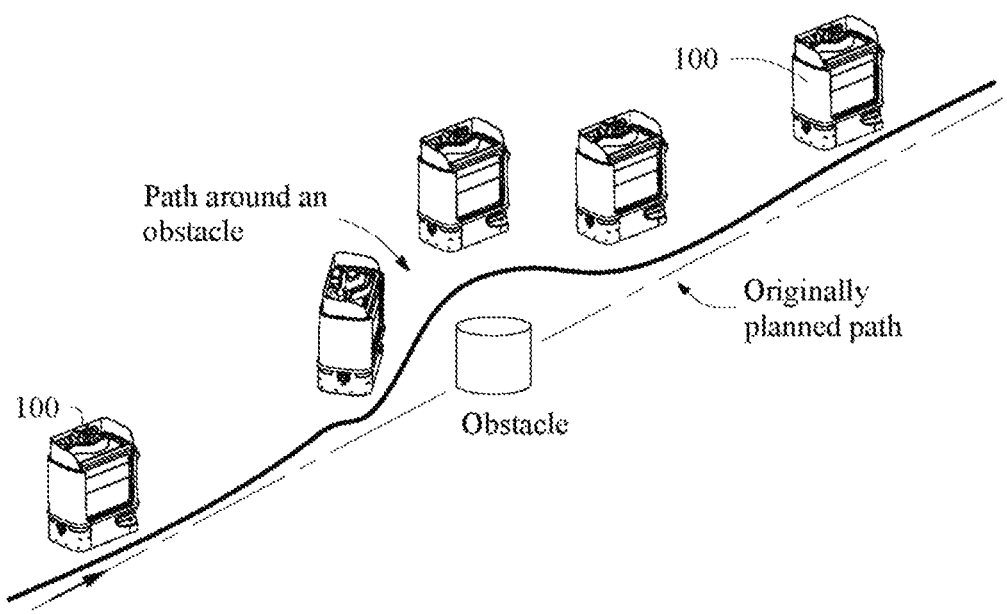
FIG. 22 is a schematic view showing the robotic assistant avoiding an obstacle during movement along a planned path.

With reference to FIG. 22, the robotic assistant 100, including mechanical and software aspects as described above, can be an autonomous robot having capabilities that include accurate localization, motion planning, and trajectory tracking. The robotic assistant 100 can determine its real-time position in a known map during movement along a planned path. If there is a dynamic obstacle (e.g., obstacle in FIG. 22) on the planned path, the robotic assistant 100 can detect the obstacle and plan a new path to avoid the obstacle. With these capabilities, the robotic assistant 100 can autonomously move between a starting location and a target location so as to achieve an assigned task, such as moving from location A to location B, fetching medicines from location B, and delivering the medicines to location C. This allows for smart logistics and provides for an unsupervised end-to-end logistics solution.

Figure 23:
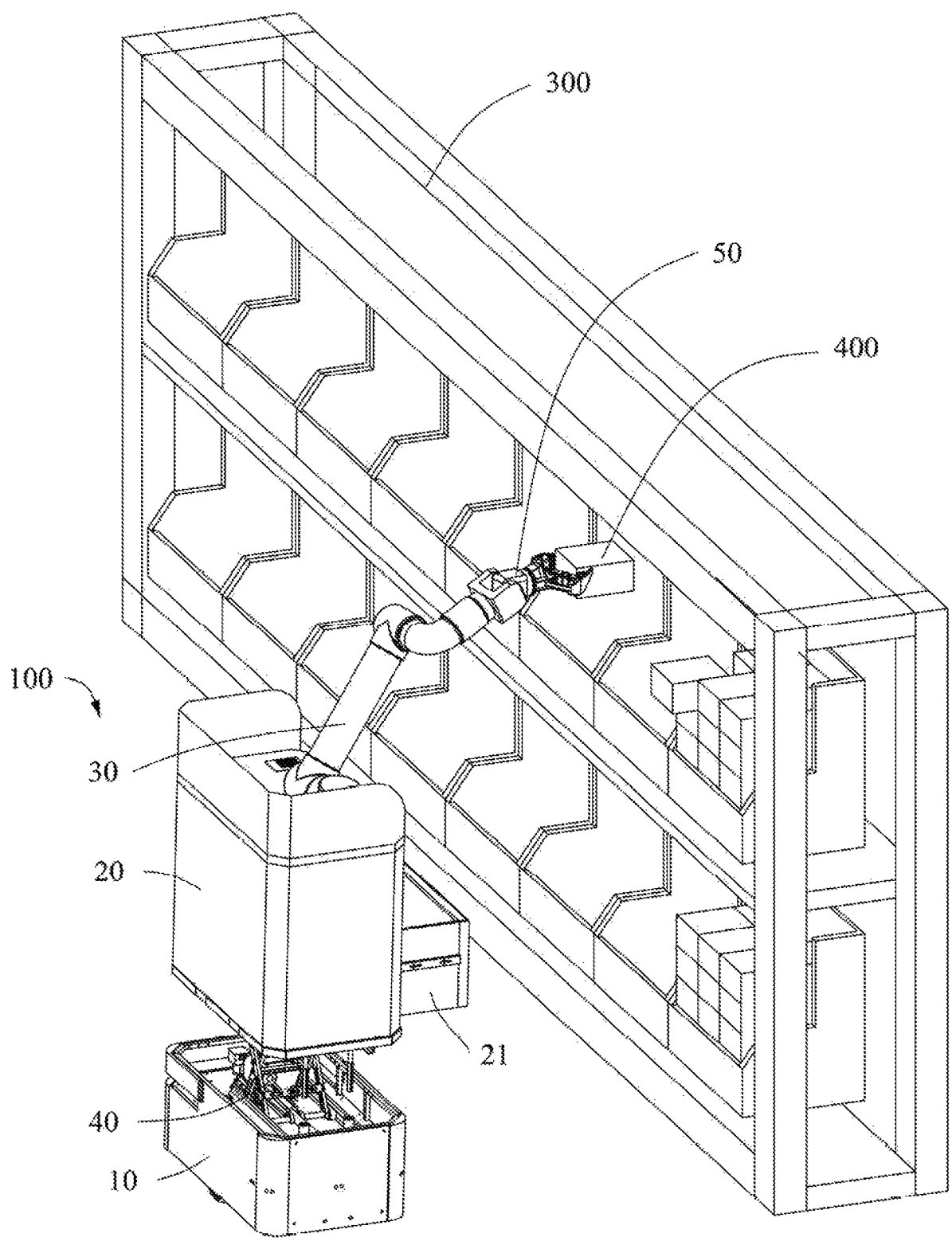
FIG. 23 is a schematic view that shows the robotic assistant picking up a determined object from the storage shelf.

With reference to FIG. 23, the robotic assistant 100, including mechanical and software aspects as described above, can be an autonomous robot including a foldable arm 30 with a high dexterous EOAT 50, which is versatile enough to perform precision grasps on small objects, as well as robust power grasps on heavier/bulkier objects. The robotic assistant 100 is able to identify objects in a scene, train or detect an optimal grasp pose for each object geometry, localize objects relative to the manipulator base or the EOAT, plan collision-free or "collision-safe" path to pre-grasp pose, plan grasping configuration, and localize objects in post-grasp configuration. With these capabilities, the robotic assistant 100 can provide an unsupervised end-to-end logistics solution to cater to various delivery and logistics needs. Specifically, as shown in FIG. 23, after the robotic assistant 100 has moved to a target location (e.g., shelf 300), the foldable arm 30 and the EOAT 50 are controlled to be in a state such that the EOAT 50 can reach a determined position to pick up a determined object 400. During this process, the robotic assistant 100 will determine the reachability to the object 400 and may control the elevation mechanism 40 to move the drawer mechanism 20 up to a determined height such that the foldable arm 30 and the EOAT 50 can reach the object 400. In one embodiment, after the EOAT 50 has grasped the object 400, the robotic assistant 100 may open one drawer 21 to allow the foldable arm 30 to load the object 400 into the drawer 21, and close the drawer 21 before the robotic assistant 100 is in motion. After the robotic assistant 100 has moved from the shelf 300 to a determined location, the robotic assistant 100 may open the drawer 21 to allow the foldable arm 30 to unload the object 400. During this loading and unloading process, the robotic assistant 100 may employ a tracking system (e.g. RFID enabled item tracking, or bar code scanner) to track stock of the objects (e.g., medicine, gloves) that are being loaded and unloaded. Additionally, the tracking system allows for the robotic assistant 100 to determine which authorized personnel or patient has loaded, received, and/or opened the drawer mechanism 20. All of this information can be uploaded to a centralized database for tracking purposes and can be used to re-order stock automatically when certain thresholds are met. Moreover, the tracking system can send a visual, audio, or electronic alert when the authorized personnel or patient has loaded, received, and/or opened the drawer mechanism 20 or when stock is depleted.

Figure 24:
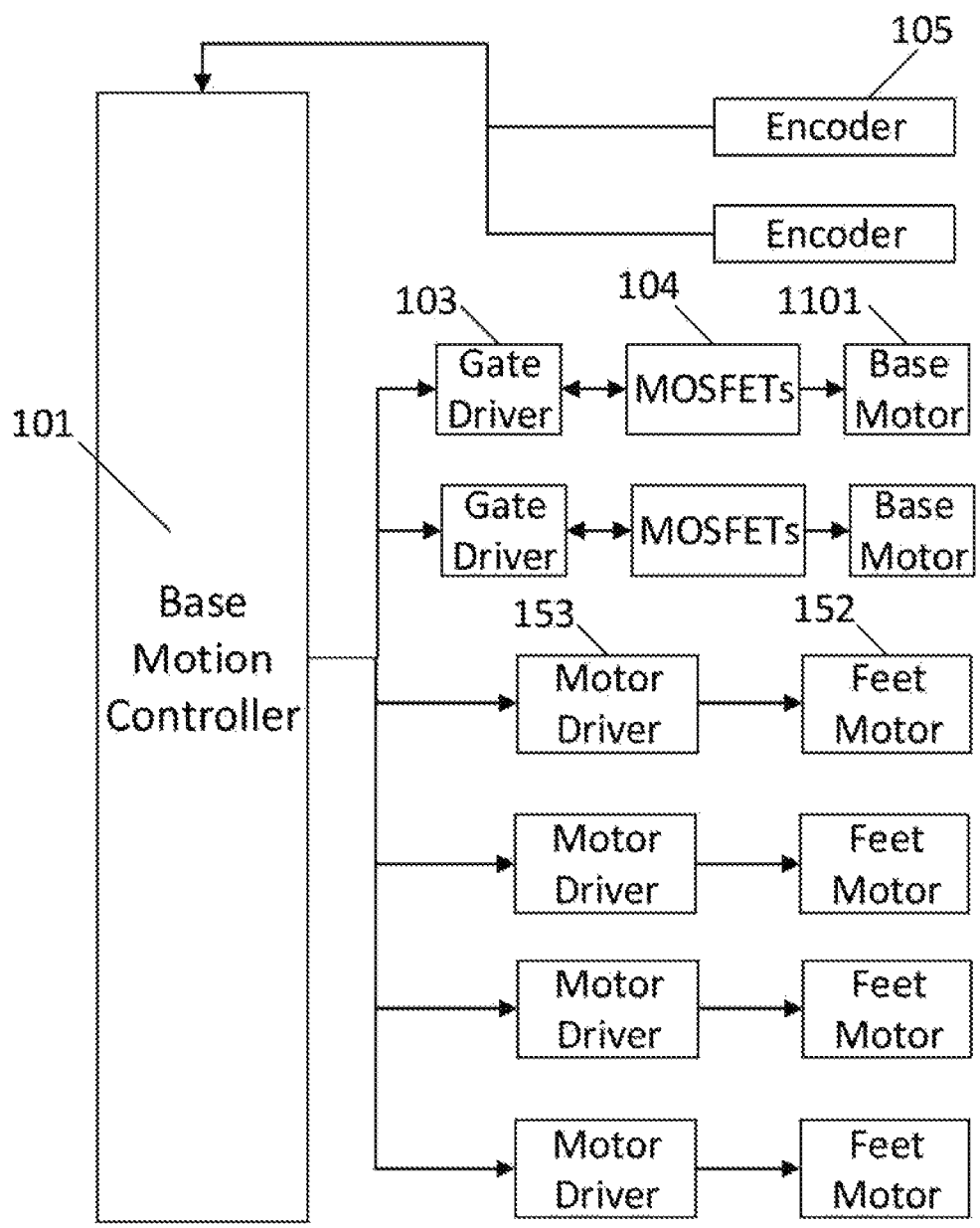
FIG. 24 is a schematic block diagram of a base control subsystem of the robotic assistant according to one embodiment.

With reference to FIG. 24, in one embodiment, the robotic assistant 100 includes two base motors 1101 for driving two wheels 111 of the base 10, respectively. The base motors 1101 can be direct current (DC) motors. The robotic assistant 100 includes two motor drivers 102 to drive the two base motors 1101, respectively. The base motion controller 101 directs the motion of the base motors 1101 in response to command instructions from a processor of the robotic assistant. The base motion controller 101 can be a DC motor controller that can achieve speed control of DC motors using pulse width modulation (PWM) method. The base motion controller 101, based on its programming, performs various calculations and gives an output to the gate drivers of the motor drivers 102 and motor drivers 153, which in turn drive the base motors 1101 and the feet motors 152. In other embodiments, the base motors 1101 and the feet motors 152 may be controlled by two or more separate motion controllers.

In one embodiment, each motor driver 102 includes a gate driver 103 electrically connected to the base motion controller 101, and a number of transistors 104 that are electrically connected to one base motor 1101. The gate driver 103 and the transistors 104 may be separate components, or integrated into one single integrated circuit. Each base motor 1101 includes an encoder 105 that is configured to detect an angular position of a rotor of the base motor 1101, and outputs rotor angle information as a rotor position signal to the base motion controller 101. In other embodiments, the encoder 105 may be replaced by other position sensors, such as Hall effect sensors, back electromotive force (EMF) zero-crossing detectors, and/or generally any other devices that can generate information indicative of the angular position of the rotor of the base motor 1101.

The angular position signals from the two encoders 105 allow the base motion controller 101 to generate closed loop commands that are provided to the gate drivers 103. The angular position signals from the two encoders 105 also serve as additional odometry information to enhance navigation and self-localization performance. The gate drivers 126 then generate variable duty cycle PWM motor drive signals to drive the base motors 1101. Specifically, there may be six transistors 104 that are arranged in three half-H bridge arrangements. Each gate driver 126 generates gate drive signals to drive the six transistors 104, respectively. The six transistors 104 generate the variable duty cycle PWM motor drive signals that cause one base motor 1101 to rotate. In one embodiment, each of the transistors 104 is an N-channel metal oxide semiconductor field effect transistor (MOSFET). It should be noted that the transistors 104 are not limited to N-channel MOSFETs, and other types of switching elements may be employed, for example P-channel MOSFETs, bipolar junction transistors (BJTs), silicon-controlled rectifiers (SCRs), thyristors, triacs, or other similar switching elements. It should be noted that the motor driver 12 is not limited and can change according to actual needs. For example, the motor driver 12 may be replaced by commercially available DC motor drivers.

The base motion controller 101 receives commands from the processor of the robotic assistant. The commands may include many different instructions, including descriptions of the motion to be achieved by the wheels 111, or instructions to the base motion controller 101 to perform other system maintenance/system monitoring tasks.

An example of an instruction describing motion would be the transmission of a target speed to be achieved over a predetermined time. The base motion controller 101 is programmed in such a manner as to continuously monitor and calculate the speed of the wheels 111 using the signals from the encoder 105 associated with each wheel 111, and can thus determine the difference between the targeted speed and the current speed. The base motion controller 101 can then convert this difference into an instruction to its onboard pulse width modulator (PWM) system to increase or decrease the duty cycle of the PWM signal. This PWM signal is fed through the gate drivers 103 to the transistors 104 and results in a corresponding increase or decrease in the current directed into the coils of the base motors 1101, causing the base motors 1101 to go faster or slower.

Through a similar sequence of operations, the direction of motion may also be controlled, in that a command from the processor of the robotic assistant to turn left or turn right can be converted by the base motion controller 101 to signals to drive the two wheels 111 at different rates, turning the robotic assistant 100 as it moves. In one embodiment, another sequence of operation for the base motion controller 101 is to receive a command to move the wheeled base 10 a predetermined distance forward, backward, or along a path described as a sequence of positions relative to the current positions of the wheeled base 10.

The base motion controller 101 may also perform other functions. In particular the base motion controller 101 may report to the processor of the robotic assistant the position of the wheels 111, the angular distance moved by the wheels 111, or the speed by calculating this information from information derived from the encoders 105.

The robotic assistant 100 including the two differentially driven wheels 111 is a differential-drive wheeled mobile robot. The two wheels are independently driven. One or more passive castor wheels are used for balance and stability. If the wheels rotate at the same speed, the robot moves straightforward or backward. If one wheel is running faster than the other, the robot follows a curved path along the arc of an instantaneous circle. If both wheels are rotating at the same speed in opposite directions, the robot turns about the midpoint of the two driving wheels.

In one embodiment, the feet motors 152 are DC motors, and each of the motor drivers 153 may include an H-bridge circuit that includes four switching elements (e.g., MOS-FETs). Specifically, the H-bridge circuit includes two high-side switching elements S1 and S2, and two low-side switching elements S3 and S4. The high-side switching element S1 and the low-side switching element S3 are connected in series, and the high-side switching element S2 and the low-side switching element S4 are connected in series. The switching elements S1, S3 and the switching elements S2, S4 are connected in parallel between a power supply and ground. The feet motor 152 driven by the motor driver 153 are connected to a connection point of the switching elements S1 and S3, and a connection point of the switching elements S2 and S4. When the switching elements S1 and S4 of one motor driver 153 are turned on, the feet motor 152 driven by the motor driver 153 rotates in a first direction (e.g., clockwise direction). When the switching elements S2 and S3 are turned on, the feet motor 152 rotates in an opposite second direction (e.g., counterclockwise direction). The configuration of the H-bridge circuit is not limited and may change according to actual needs.

Each motor driver 153 may further include a gate driver. The gate driver is configured to generate gate drive signals to drive the H-bridge circuit. By changing the duty cycle of the PWM input signals from the base motion controller 101, the speed of the feet motors 152 can be adjusted. It should be noted that the configuration of the motor drivers 153 is not limited and other commercially available DC motor drivers may be used instead.

In one embodiment, in response to a command from the processor of the robotic assistant, the base motion controller 101 controls the feet motors 152 to move the feet 151 between their retracted positions (see FIG. 8A) and extended positions (see FIG. 8B). The feet motors 152 can be linear motors that are not back drivable, which means that sliders of the feet motors 152 will be locked when the feet motors 152 are de-energized, thereby enabling the feet 151 to stay in contact with the support surface in the case of power failure during object manipulation tasks. In one embodiment, each feet motor 152 may have built-in mechanical snap-action switches to automatically stop its motion when either end of the feet travel is reached. It should be noted that FIG. 24 shows only one example, and that the robotic assistant 100 may have more components than shown, or may have a different configuration or arrangement of the components.

Figure 25:
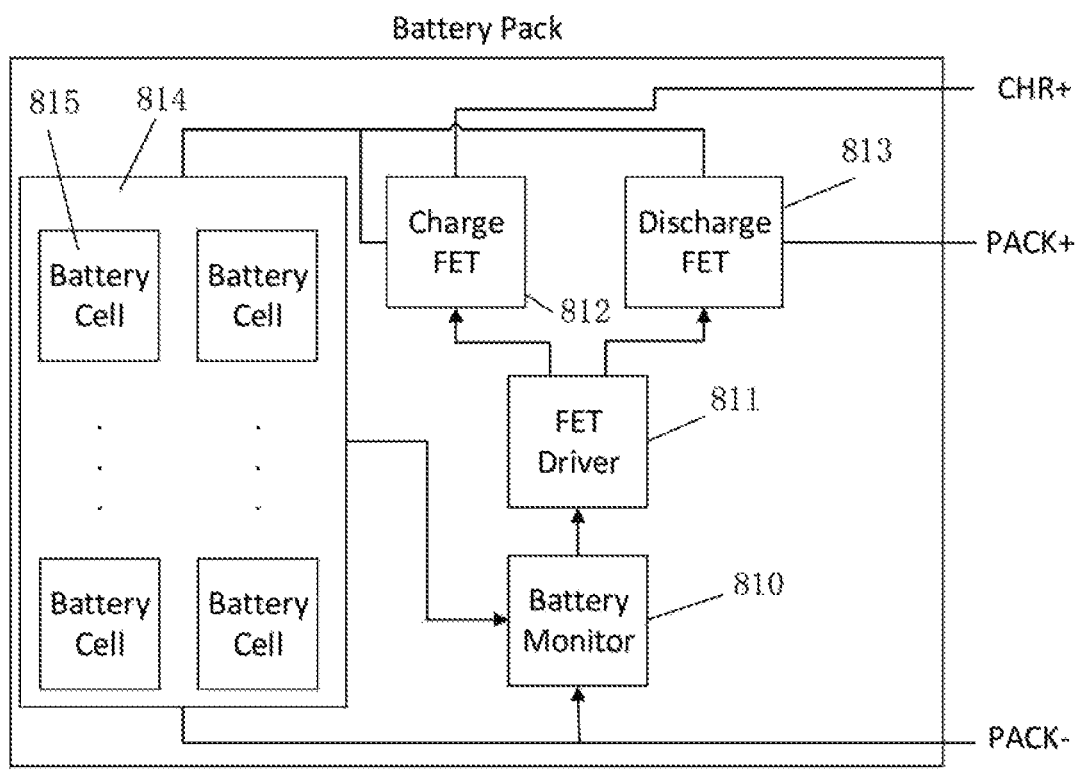
FIG. 25 is a schematic block diagram of a battery pack of the robotic assistant according to one embodiment.

With reference to FIG. 25, in one embodiment, the battery pack 801 includes a battery monitor 810 electrically connected to the processor of the robotic assistant, and a battery module 814 including a number of battery cells 815. The processor of the robotic assistant can use the battery monitor 810 to implement battery pack management functions, such as monitoring (cell voltages, pack current, pack temperatures), protection (controlling charge/discharge FETs), and balancing. The power system 81 further includes a FET driver 811, a charge FET 812, and a discharge FET 813. In one embodiment, the charge FET 812 is connected to the positive terminal of the battery module 814, and the discharge FET 813 is connected to the positive charging terminal of the battery module 814. In another embodiment, the battery cells 815 may be replaced by separate battery modules that can back up one another and provide more freedom because they can be arranged at different locations according to actual needs.

Figure 26:
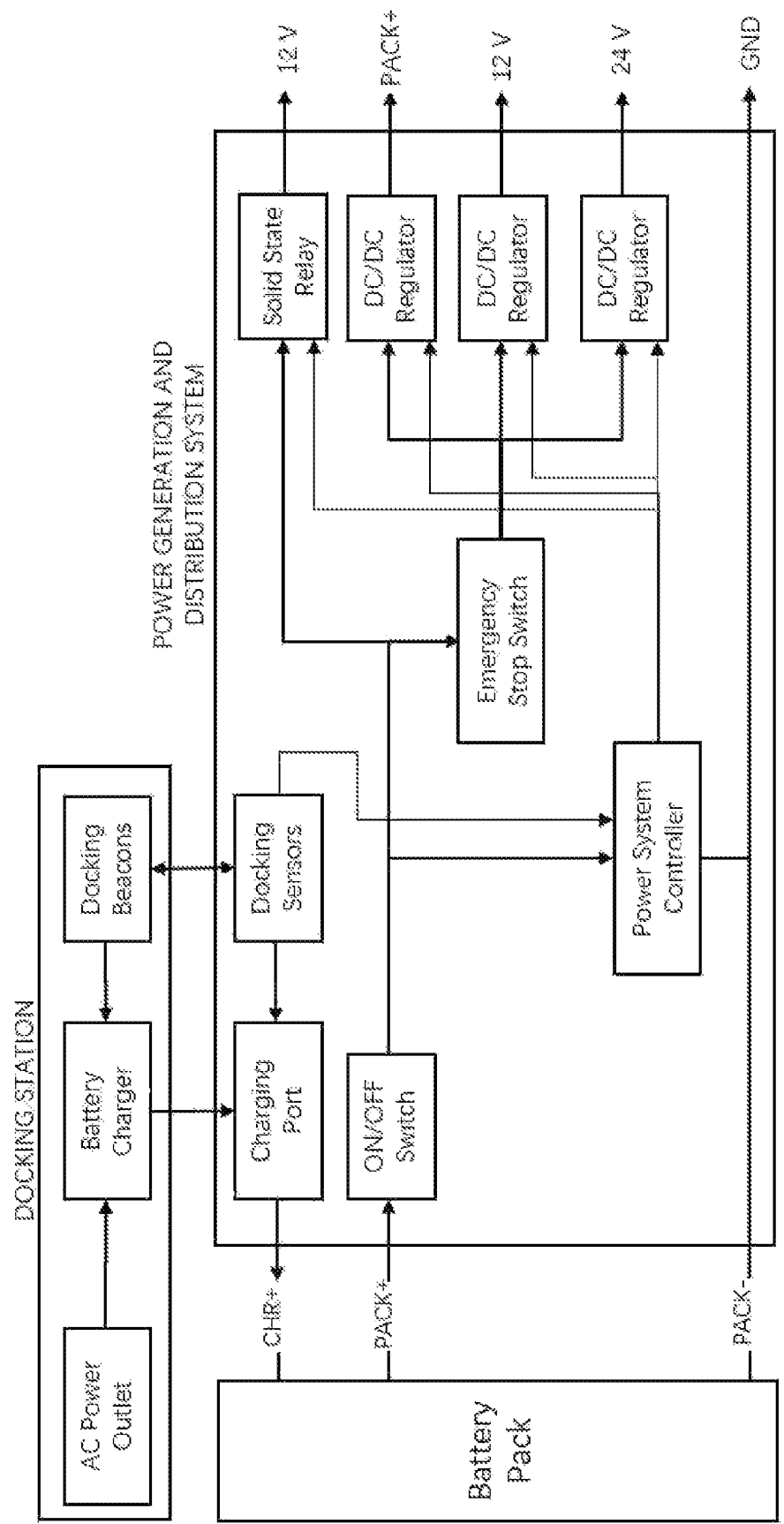
FIG. 26 is a schematic block diagram of a power system of the robotic assistant according to one embodiment.

In one embodiment, the charge FET 812 and the discharge FET 813 can be N-channel MOSFETs. The charge FET 812 and the discharge FET 813 are both electrically connected to the FET driver 811. In response to commands from the battery monitor 810, the FET driver 811 may turn on/off the charge FET 812 and/or the discharge FET 813. When the charge FET 812 is turned on, it allows a charging current from the charging terminal CHR+ to flow into the battery cells 815 to charge the battery cells 815. When the discharge FET 813 is turned on, it allows a discharge current from the cells 815 to flow to the positive terminal of the battery module 814 such that the battery module 814 can power other components of the robotic assistant 100. When the charge FET 812 is turned off, the charging current is blocked by the charge FET 812, which stops the charging process when the cells 815 are fully charged. When the discharge FET 813 is turned off, the discharging current is blocked by the discharge FET 813, which can prevent the battery module 814 from being damaged due to overdischarging. It should be noted that FIGS. 25 and 26 show only one example of the power system 81, and that the power system 81 may have more components than shown, or may have a different configuration or arrangement of the components.

It should be appreciated the above disclosure detailed several embodiments of the robotic assistant 100 performing logistics and other tasks. As mentioned above, the robotic assistant 100 can be employed in assisted living facilities or healthcare facilities to provide an unsupervised end-to-end logistics solution. However, the disclosure is not limited thereto. In other exemplary usage scenarios, the robotic assistant 100 may be used in schools, offices, or warehouses, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A wheeled base, comprising:
   a housing;
   two driven wheeled mechanisms positioned on a bottom of the housing and on opposite sides of the housing;
   at least one passive wheel positioned on the bottom of the housing;
   actuated feet positioned on the bottom of the housing and configured to move up and down;
   sensors; and
   a battery pack arranged within the housing;
   wherein the two driven wheeled mechanisms each comprises a damping mechanism, each damping mechanism comprises at least two dampers configured to absorb impact caused by an upward movement of the housing, and absorb impact caused by a downward movement of the housing.

2. The wheeled base of claim 1, wherein the actuated feet are spaced apart from one another and disposed at corners of the housing.

3. The wheeled base of claim 2, wherein each of the actuated feet comprises a motor fixed to the housing and a foot that is driven by the motor to be movable between a retracted position and an extended position.

4. The wheeled base of claim 1, further comprising a movable mechanism and a static member that are arranged on top of the housing, wherein at least one of the sensors is disposed on the static member.

5. The wheeled base of claim 1, wherein the sensors comprise a plurality of ultrasonic sensors and a plurality of infrared sensors, the ultrasonic sensors are disposed on a front end, a rear end, and two sides of the housing, and the infrared sensors are disposed on the front end and the rear end of the housing.

6. The wheeled base of claim 1, wherein the two driven wheeled mechanisms each comprise a first wheel, and the at least one passive wheel comprises two second wheels, the first wheels are arranged in a widthwise direction of the housing, and the two second wheels are arranged in a lengthwise direction of the housing.

7. The wheeled base of claim 1, wherein each of the at least two dampers comprises a tube and a spring-loaded rod that is partly received in the tube and slidable with respect to the tube.

8. The wheeled base of claim 7, wherein spring-loaded rods of the at least two dampers extend in opposite directions.

9. A wheeled base, comprising:
   a housing;
   two first wheels and two second wheels that are positioned on a bottom of the housing, the two first wheels configured to actuate movement of the housing on a surface;
   actuated feet positioned on the bottom of the housing and configured to move up and down;
   sensors;
   a battery pack arranged within the housing; and
   damping mechanisms coupled to the first wheels and the second wheels, wherein the damping mechanisms each comprise at least two dampers that are arranged in an opposite manner in a vertical direction and configured to absorb impact when the housing is moving up and down with respect to the surface.

10. The wheeled base of claim 9, wherein the actuated feet are spaced apart from one another and disposed at corners of the housing.

11. The wheeled base of claim 10, wherein each of the actuated feet comprises a motor fixed to the housing and a foot that is driven by the motor to be movable between a retracted position and an extended position.

12. The wheeled base of claim 9, further comprising a movable mechanism and a static member that are arranged on top of the housing, wherein at least one of the sensors is disposed on the static member.

13. The wheeled base of claim 9, wherein the sensors comprise a plurality of ultrasonic sensors and a plurality of infrared sensors, the ultrasonic sensors are disposed on a front end, a rear end, and two sides of the housing, and the infrared sensors are disposed on the front end and the rear end of the housing.

14. The wheeled base of claim 9, wherein each of the at least two dampers comprises a tube and a spring-loaded rod that is partly received in the tube and slidable with respect to the tube.

15. The wheeled base of claim 14, wherein spring-loaded rods of the at least two dampers extend in opposite directions.

16. A wheeled base, comprising:
    a housing;
    two driven wheeled mechanisms positioned on a bottom of the housing and on opposite sides of the housing;
    at least one passive wheel positioned on the bottom of the housing;
    actuated feet positioned on the bottom of the housing, where each of the actuated feet comprises a foot that is movable to an extended position to come into contact with a surface, which allows the actuated feet to support the housing on the surface;
    sensors;
    a battery pack arranged within the housing; and
    wherein the two driven wheeled mechanisms each comprises a damping mechanism, the damping mechanisms each comprise at least two dampers that are configured to form a bi-directional damping system in a vertical direction, so as to absorb impact caused by upward movement and downward movement of the housing.

17. The wheeled base of claim 16, wherein the actuated feet are spaced apart from one another and disposed at corners of the housing.

18. The wheeled base of claim 16, wherein each of the at least two dampers comprises a tube and a spring-loaded rod that is partly received in the tube and slidable with respect to the tube.

19. The wheeled base of claim 18, wherein spring-loaded rods of the at least two dampers extend in opposite directions.

20. The wheeled base of claim 16, wherein the housing defines a space to receive the battery pack, the space has an opening that allows the battery pack to be removed.

* * * * *